United States Patent
Lohmeier et al.

(10) Patent No.: US 9,616,459 B1
(45) Date of Patent: Apr. 11, 2017

(54) POLYMERIC COATINGS FOR FORTIFICATION OF VISIBLE, INFRARED, AND LASER OPTICAL DEVICES

(71) Applicant: LOCKHEED MARTIN CORPORATION, Bethesda, MD (US)

(72) Inventors: Linda Ann Lohmeier, Kissimmee, FL (US); Franklin Charles Basile, Geneva, FL (US); Wayne Powell, Palm Harbor, FL (US); Dennis W. Surface, Clermont, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 133 days.

(21) Appl. No.: 14/549,804

(22) Filed: Nov. 21, 2014

Related U.S. Application Data

(60) Provisional application No. 61/980,818, filed on Apr. 17, 2014.

(51) Int. Cl.
 *B05D 3/10* (2006.01)
 *B05D 3/00* (2006.01)

(52) U.S. Cl.
 CPC ............. *B05D 3/002* (2013.01); *B05D 3/104* (2013.01); *B05D 3/007* (2013.01); *B05D 3/107* (2013.01); *B05D 2203/35* (2013.01); *B05D 2350/00* (2013.01)

(58) Field of Classification Search
 CPC ........ B05D 3/002; B05D 3/007; B05D 3/104; B05D 3/107; B05D 2203/35; B05D 2350/00
 USPC .................................................. 427/301, 337
 See application file for complete search history.

(56) References Cited

U.S. PATENT DOCUMENTS

| | | | |
|---|---|---|---|
| 5,922,787 A * | 7/1999 | Kondo | C08G 65/007 106/18.35 |
| 6,807,824 B1 * | 10/2004 | Miwa | C03C 15/00 216/97 |
| 7,294,731 B1 | 11/2007 | Flynn et al. | |
| 8,191,992 B2 | 6/2012 | Lin et al. | |
| 8,664,323 B2 | 3/2014 | Iyer et al. | |
| 2002/0046757 A1 * | 4/2002 | Inagaki | B08B 3/00 134/18 |
| 2004/0253369 A1 * | 12/2004 | Jallouli | B05D 3/141 427/162 |
| 2009/0208728 A1 * | 8/2009 | Itami | C07F 7/1836 428/318.4 |

(Continued)

OTHER PUBLICATIONS

Gupta et al., "Ultrathin PFPE Film Systems Fabricated by Covalent Assembly: An Application of Tribology," Tribology Letters, vol. 45 (2012), pp. 371-378.

*Primary Examiner* — Kirsten Jolley
(74) *Attorney, Agent, or Firm* — Terry M. Sanks, Esq.

(57) ABSTRACT

A method for coating a surface of a material involves contacting a surface of a material with a surface activator containing a fluoride-containing compound and an organic solvent to form an activated surface, contacting the activated surface with a protective reagent to form an initial coated surface, and contacting the initial coated surface with a thinning agent containing a fluoride-containing compound and a surfactant to from a final coated surface, wherein the final coated surface is coated with a protective coating that is covalently bonded to the surface of the material.

24 Claims, 7 Drawing Sheets

(56) References Cited

U.S. PATENT DOCUMENTS

| | | |
|---|---|---|
| 2011/0177241 A1* | 7/2011 | Lee .................... C03C 17/006 427/165 |
| 2012/0034435 A1 | 2/2012 | Borrelli et al. |
| 2012/0107558 A1 | 5/2012 | Koval et al. |
| 2012/0237777 A1 | 9/2012 | Lu |
| 2013/0135741 A1 | 5/2013 | Lee et al. |
| 2013/0228100 A1 | 9/2013 | Kleyer et al. |

* cited by examiner

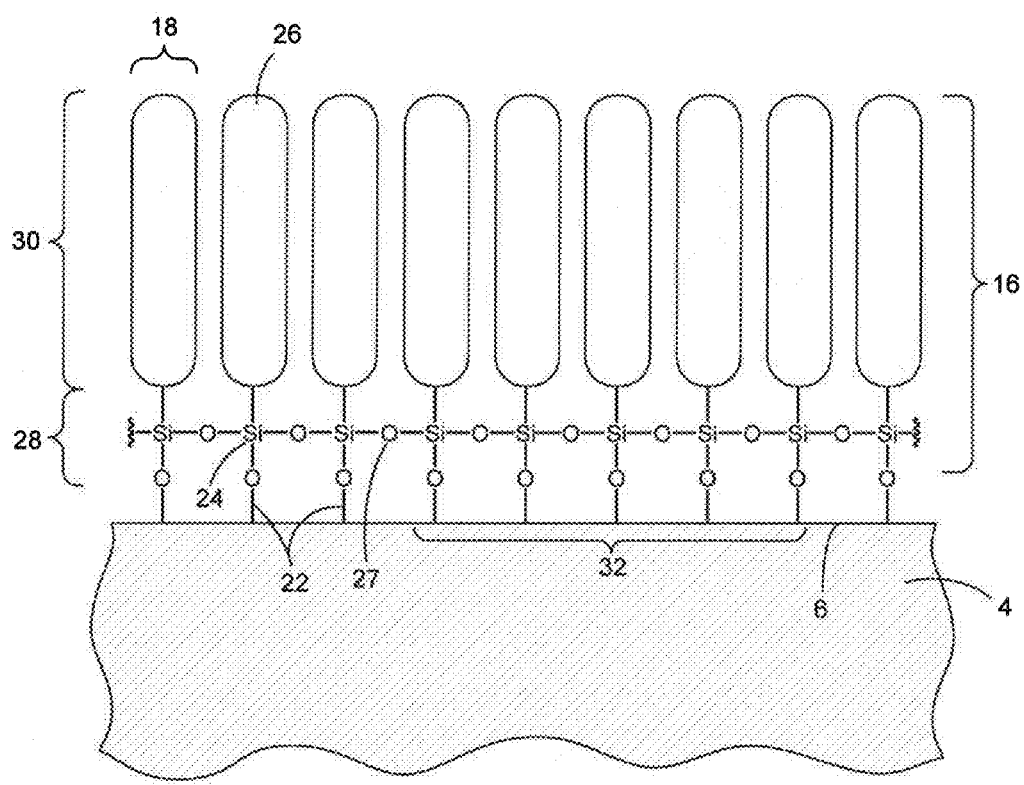

POLYMERIC COATINGS FOR FORTIFICATION OF VISIBLE, INFRARED, AND LASER OPTICAL DEVICES

CROSS-REFERENCE TO RELATED APPLICATIONS

This application claims the benefit of U.S. Provisional Application No. 61/980,818, filed on Apr. 17, 2014, the entire contents of which are incorporated herein by reference.

BACKGROUND

An optical device is a device that creates, manipulates, or measures electromagnetic radiation. Optical devices include simple equipment such as lenses, magnifiers and mirrors, as well as more intricate apparatuses such as microscopes, telescopes, lasers, video displays, cameras and specialized imaging and targeting systems. Specialized optical devices such as electro-optic/infrared (EO IR) sensors, laser imaging systems and targeting sensors are often critical components in military and commercial applications involving surveillance, reconnaissance, targeting, analysis and space exploration. Such devices are often required to operate with a high degree of reliability and precision in a variety of different settings including ground, water, airborne and space environments.

Many optical devices are required to efficiently and reliably transmit and/or detect specific types of electromagnetic radiation (or frequency ranges thereof) under varying and often inclement environmental conditions. In order protect vital sensory or transmissive components, such electro-optical devices often include an optical window formed of a material that is transparent for a wavelength range of photons to be transmitted or detected. Optical windows are sometimes coated with materials that protect the optical surface, alter its reflective or transmissive properties, or somehow affect the electromagnetic radiation contacting the optical surface.

An anti-reflective (AR) coating, for example, is a type of optical coating applied to optical surfaces in order to reduce reflection. This can improve the efficiency of an optical device by allowing more photons to pass through the optical window. Reducing reflection can also improve contrast and sensitivity in certain optical devices by reducing the proportion of stray light that passes through the optical window and reaches the photo-sensitive instrument. In simpler applications such as eyeglasses, AR coatings are often applied to lenses to reduce glint and to make the eyeglass user's eyes more visible to others.

FIG. 1 illustrates one example of an optical window 1 including an optical substrate 2 coated with an anti-reflective coating 4 whose surface acts as the optical surface 6 for an optical device.

Optical surfaces may also be coated with protective materials that protect the surface against damage or surface modification (e.g., staining or smudging) that may occur through contact with the environment. For example, electronic devices which include an interactive touch-screen display (e.g., smart phones) are often smudged and/or stained with fingerprints, skin oil, sweat, cosmetics, etc., during use. Once these stains and/or smudges adhere to the optical surface they may not be easily removed and can in some cases cause permanent damage. Optical surface damage can profoundly affect the performance of specialized electro-optic devices-such as military and commercial devices operated in harsh environments. In some cases, optical surface damage or contamination can jeopardize the ability of a specialized device to detect and/or transmit the required electromagnetic wavelengths.

FIG. 2, for example, illustrates optical surface damage than can occur to an optical surface 6 of a field-turreted electro-optic device 3 after prolonged exposure to harsh environmental conditions. The turreted optical instrument 3 of FIG. 2 is from a forward-looking infrared (FLIR) camera in which the optical surface 6 is embedded within an optical turret assembly 8. Exposure of the electro-optic device 3 to heat and various contaminants over an extended period of time has caused both staining (spotting) and corrosion to the AR coating 4.

The optical surface 6 of FIG. 2 contains a region 10 of relatively low surface corrosion and a region 12 of relatively high surface corrosion, which are clearly delineated by the corrosion boundary line 11. High levels of surface corrosion as seen in region 12 can occur via a number of different mechanisms depending upon the composition of the AR coating 4 and the optical substrate 2. For example, when the optical window 1 is composed of a silicon substrate 2 coated with an AR coating 4 of magnesium fluoride ($MgF_2$) having an undercoating or presence of praseodymium (Pr), then an originally-green-tinted optical surface 6 can turn yellow within the region 12 of high surface corrosion due to oxidation of the Pr. Alternatively, for example, when the optical window 1 is composed of a quartz substrate 2 coated with an AR coating 4 of $MgF_2$ or titanium dioxide ($TiO_2$) having an undercoating or presence of hafnium (Hf), then the optical surface 6 turns white or becomes frosted within the region 12 of high surface corrosion due to oxidation of the Hf. The irregular spotting 14 contained on the optical surface 6 can occur due to contact with organic and inorganic contaminants-especially when the contaminated optical surface 6 is exposed to high temperatures.

When such damage occurs, it is typically necessary to replace the optical window 1, which may require the entire optical device or assembly (e.g., the optical turret assembly 8) to be transported back to a manufacturing site, depot, or laboratory for replacement. Both the process of disassembly and the time required for transportation can be very expensive. For specialized military and commercial systems employing such optical devices, disassembly and replacement may render the systems inoperable and unable to accomplish critical missions. In such cases the military or commercial user may therefore be required (as a matter of practicality) to procure and store a spare device or assembly which is both expensive and in some scenarios highly impractical.

Although protective coatings could, in some optical devices, be applied to the surface of an AR coating 4 or an optical substrate 2 in order to reduce or eliminate surface corrosion and spotting, conventional protective coatings cannot be applied to many specialized electro-optics that detect certain electromagnetic frequencies. Some protective coatings can adversely affect the performance of highly-sensitive electro-optic detection and imaging devices due to the optical characteristics of the protective materials or the thickness of the protective coatings.

SUMMARY

The present inventors have recognized that a need exists to discover methods and materials capable of protecting optical surfaces from surface degradation and damage caused by exposure to extreme environmental conditions and contaminants—while at the same time preserving the optical properties of the protected surfaces. Ideal methods and materials would also be suitable for protecting a wide variety of different surface materials including metals, glasses, ceramics, composites and plastics, would protect these surface materials against damage in the presence of organic and inorganic contaminants under extreme environmental conditions, and could be applied during manufacturing and/or repair of these surface materials. A need also exists to discover methods and materials enabling the protection of optical surfaces under operational (in-field) conditions to impart the high levels of protection described above without adversely affecting the optical properties of the protected surfaces.

The present inventors discovered that optical surfaces can be adequately protected using a wide variety of different coating systems—such that the optical properties of the protected surfaces are not materially affected—by ensuring that the protective coating is formed as an exceptionally thin hydrophobic monolayer. It was discovered that protective coatings can be formed as thin monolayers covalently bound to a variety of different surface materials by modifying conventional coating systems to include a pre-coating surface activation process and a post-coating thinning process.

One embodiment provides a method for coating a surface of a material. The method comprises contacting a surface of a material with a surface activator comprising a first fluoride-containing compound and an organic solvent to form an activated surface, contacting the activated surface with a protective reagent to form an initial coated surface, and contacting the initial coated surface with a thinning agent comprising a second fluoride-containing compound and a surfactant to form a final coated surface, wherein the final coated surface is coated with a protective coating that is covalently bonded to the surface of the material.

Another embodiment includes the steps of performing a first surface test on the surface of the material in order to detect the presence or absence of a hydrophobic film or substance on the surface of the material, and performing a second surface test on the final coated surface in order to detect the presence or absence of a hydrophilic area or substance on the final coated surface.

Another embodiment includes at least one step of contacting the surface of the material with a cleaner to clean the surface of the material.

Another embodiment includes the steps of contacting the activated surface with the protective reagent to form a covered surface, drying the covered surface for a predetermined drying time period to form a dried surface, and heating the dried surface at a predetermined drying temperature and at a predetermined drying humidity for a predetermined heating time period to form the initial coated surface.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 6 illustrates one embodiment of a protective monolayer coating formed from a series of monomer units covalently bound to a surface via polar binding sites;

DETAILED DESCRIPTION

Figure 1:
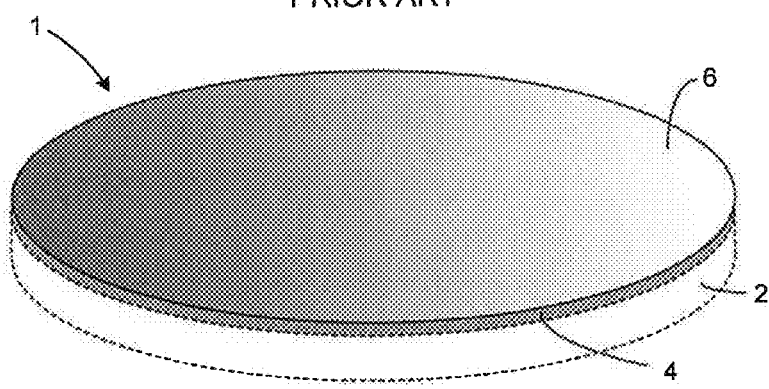
FIG. 1 illustrates an optical window including an optical substrate coated with an anti-reflective coating.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting exemplary applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

The present inventors discovered that optical surfaces can be adequately protected using a wide variety of different coating systems—such that the optical properties of the protected surfaces are not materially affected—by ensuring that the protective coating is formed as an exceptionally thin hydrophobic monolayer. It was discovered that protective coatings can be formed as thin monolayers covalently bound to a variety of different surface materials by modifying conventional coating systems to include a pre-coating surface activation process and a post-coating thinning process.

The pre-coating surface activation process enables the surface to be protected to contain a relatively high concentration of polar binding sites capable of forming covalent bonds with a variety of organic coupling agents and functional groups to produce low surface energy coatings. The surface activation also forms a uniformly polar (hydrophilic) surface free of non-polar (hydrophobic) constituents and contaminants. It is believed that these effects reduce the formation of multi-layer coatings by minimizing discontinuities in the resulting self-assembled monolayers as described below. The post-coating thinning process enhances monolayer formation by physically and/or chemically removing additional (outer) layers and contaminants that can become bound (through covalent or non-covalent interactions) to the monolayer, or are otherwise associated with (e.g., solubilized by) the monolayer, during the coating process.

Performing these additional processing steps enables the resulting protective coatings to be formed as thin, self-assembled monolayers that can protect a variety of optical surfaces against damage and degradation—while at the same time maintaining the optical properties of sensitive electro-optical devices containing the optical surfaces.

A. Protective Monolayer Coatings and Apparatuses Containing Protective Coatings

Figure 3A:
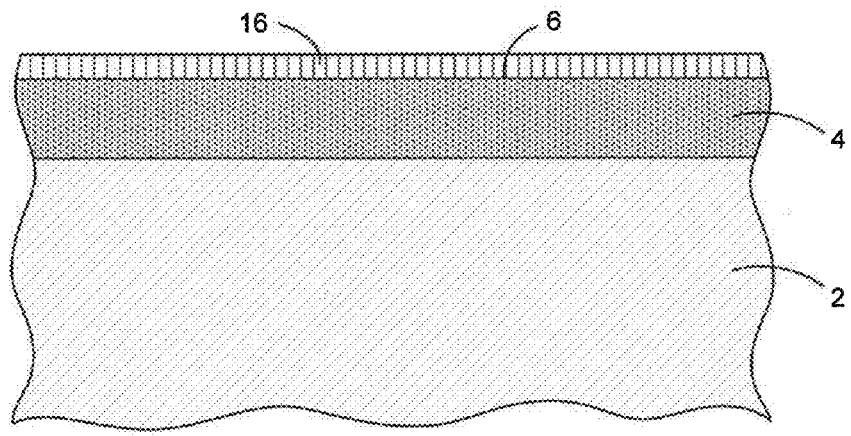
FIGS. 3A-3C are sectional views of a coated substrates.

FIG. 3A illustrates one embodiment of the present disclosure in which a protective monolayer coating 16 has been applied to the optical surface 6 of an optical window 1. In this embodiment the optical surface 6 is the surface of an anti-reflective coating 4 which covers an underlying optical window substrate 2. In other embodiments the protective monolayer coating 16 may be directly applied to the optical window substrate 2, or to a different substrate which could be a metal, glass, ceramic, composite, plastic, or mixtures thereof. The protective monolayer coating 16 may also be applied to other types of coatings and protective materials.

The protective monolayer coating 16 of FIG. 3A is in the form of a self-assembled monolayer (SAM) having a thickness dependent upon a length of the monomer units forming the protective monolayer coating 16, as explained below in greater detail. A SAM is a one molecule thick layer of material that bonds to a surface in an ordered way as a result of physical or chemical forces applied during a deposition/coating process. The monomer units of a hydrophobic SAM may contain long-chain alkyl groups, such as fluorinated or non-fluorinated hydrocarbons, ethers or other linear or non-linear organic groups whose length ultimately dictates the thickness of the protective monolayer coating 16. In some embodiments the monomer units of the protective monolayer coating 16 may be formed of fluorinated or non-fluorinated polymers, whose size and structure can be fine tuned to provide adequate protection depending upon the optical surface to be protected and the environmental conditions.

In some embodiments the total thickness of the monolayer coating 16 ranges from about 0.1 nm to about 1 micron. In other embodiments the total thickness of the monolayer coating 16 ranges from about 0.1 nm to about 100 nm. In still other embodiments the total thickness of the monolayer coating 16 ranges from about 0.1 nm to about 20 nm, or from about 1 nm to about 10 nm. In some embodiments the total thickness is sufficient that the coated surface exhibits a water break (as described in greater detail below) and remains intact during operation and extended use.

Figure 3B:
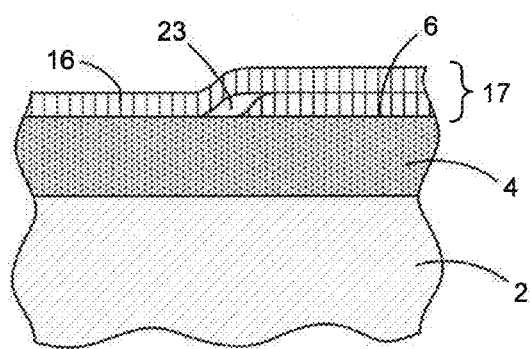
Figure 3C:
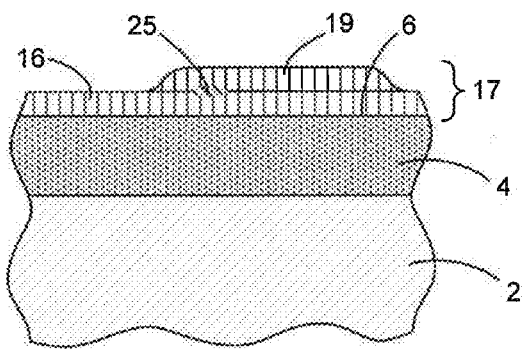

As explained above it was discovered that thin SAMs can be covalently bound to a variety of different surface materials by modifying conventional coating methods to include a pre-coating surface activation and a post-coating thinning process. FIGS. 3B and 3C illustrate the importance of the pre-coating and post-coating processes.

FIG. 3B illustrates one example of a non-inventive coating containing both a monolayer portion 16 and a multi-layer portion 17. A coating containing both monolayer portions 16 and multi-layer portions 17 will not have a uniform thickness, and therefore could adversely affect the optical properties of the underlying optical window 1. In this example the optical surface 6 contains non-bonding sites 23 in which the protective coating 16 is not covalently bound to the surface of the AR coating 4.

Without being bound to any particular theory, it is believed that such non-bonding sites 23 can serve as initiation points for formation of multi-layer portions 17 or can otherwise result in the formation of surface asperities in the resulting coating. The presence of non-bonding sites 23 during monolayer self assembly could allow reactive groups contained in the monomer precursor(s) to become bound (through covalent or non-covalent interactions) to adjacent monolayer portions 16 as shown in FIG. 3B. Alternatively, or in addition thereto, the presence of non-bonding sites 23 during monolayer self assembly could also result in the formation of bulges or protrusions (not shown) in the assembled layer such that the resulting coating would not have a uniform thickness. It is believed that non-bonding sites 23 can exist when the optical surface 6 contains a relatively low concentration of polar binding sites, or when the optical surface 6 contains non-polar (hydrophobic) constituents and/or contaminants that can mask polar binding sites.

Without being bound to any particular theory, it is believed that the pre-coating surface activation process (described in greater detail below) enhances monolayer formation by reducing the occurrence of non-bonding sites 23, and by removing non-polar (hydrophobic) constituents and contaminants from the optical surface 6 to produce a uniformly polar (hydrophilic) surface having a relatively high concentration of polar binding sites.

The presence of non-bonding sites 23 may also jeopardize the physical strength and/or chemical resistance of the resulting protective coating 16 by disrupting the bonding structure of a SAM, or by creating void spots in the protective coating 16 that may expose the underlying surface to chemical and/or physical threats.

FIG. 3C illustrates another example of a non-inventive coating containing both a monolayer portion 16 and a multi-layer portion 17. A coating that includes both monolayer portions 16 and multi-layer portions 17 will not have a uniform thickness, and therefore could adversely affect the optical properties of the underlying optical window 1. Unlike the outermost layer of the multi-layer portion 17 illustrated in FIG. 3B, no portion of the outer layer 19 of FIG. 3C is covalently bonded to the optical surface 6. Instead, in FIG. 3C the multi-layer portion 17 contains an outer layer 19 which attaches to the underlying monolayer portion 16 via at least one inter-layer bonding/interaction site 25. The inter-layer bonding/interaction site 25 may attach the outer layer 19 to the underlying monolayer portion 16 through covalent or non-covalent interactions. Such outer layers 19 are known to form using conventional coating methods and are often present as multiple layers.

Without being bound to any particular theory, it is believed that the post-coating thinning process (described in greater detail below) enhances monolayer formation by removing outer layers 19 through physical and/or chemical interactions that remove or disrupt the inter-layer bonding/ interaction sites 25. Without such removal it is believed that transmission can be adversely affected by the resulting thicker coating.

Non-limiting examples of substrates 2 may include glasses, metals, ceramics, composites, synthetic or natural polymers, or combinations thereof. Suitable polymers may include polyesters, polyamides, polyols, poly(meth)acrylates, polycarbonates, polyurethanes, polythiourethanes, polystyrenes, cellulose esters, polyvinyl chlorides, polyvinyl alcohols, polyolefins, polyimides, and copolymers thereof, to name a few non-limiting examples. Suitable metals may include ferrous and non-ferrous metals such as iron, steel, stainless steel, aluminum, zinc, magnesium, and alloys thereof, to name a few non-limiting examples. Suitable glasses may include fused silica glasses (e.g., quartz), soda-lime-silica glasses, sodium borosilicate glasses, lead-oxide glasses, aluminosilicate glasses, and oxides glasses, to name a few non-limiting examples.

Optical window substrates 2 may contain optically-transmissive materials such as aluminum oxynitrides (AlONs), amorphous materials transmitting IR radiation (AMTIRs) such as AMTIR 1, AMTIR 4 and AMTIR 5, metal halides such as barium fluoride ($BaF_2$), calcium fluoride ($CaF_2$), lithium fluoride (LiF), magnesium fluoride ($MgF_2$), potassium bromide (KBr), potassium chloride (KCl), sodium chloride (NaCl), and cesium fluoride (CsF), metal chalcogenides such as cadmium telluride (CdTe), zinc selenide (ZnSe) and zinc sulfide (ZnS), metal pnictogenides such as gallium arsenide (GaAs), optically transmissive elements such as silicon (Si), germanium (Ge) and carbon (C), optically transmissive plastics, metal oxides such as silicon dioxides (e.g., silica and quartz) and aluminum oxides (e.g., sapphire), mixed thallium salts such as thallium bromoiodide (TlBr-TlI), and mixtures thereof, to name a few non-limiting examples.

Anti-reflective (AR) coatings 4 may contain inorganic materials such as inorganic oxides, inorganic halides, or composites thereof. Examples of inorganic oxides include silica ($SiO_2$), zirconia ($ZrO_2$), alumina ($Al_2O_3$), yttria ($Y_2O_3$) and titania ($TiO_2$), to name a few non-limiting examples. Non-limiting examples of inorganic halides include magnesium fluoride ($MgF_2$), barium fluoride ($BaF_2$), calcium fluoride ($CaF_2$), lanthanum fluoride ($LaF_2$), lithium fluoride (LiF), sodium fluoride (NaF) and strontium fluoride ($SrF_2$), to name a few. In some non-limiting embodiments, for instance, the optical window 1 may contain a silicon substrate 2 coated with an AR coating 4 of magnesium fluoride ($MgF_2$) having an undercoating or presence of praseodymium (Pr). In other non-limiting cases, for instance, the optical window 1 may contain a quartz substrate 2 coated with an AR coating 4 of $MgF_2$ or titanium dioxide ($TiO_2$) having an undercoating or presence of hafnium (Hf).

Figure 4:
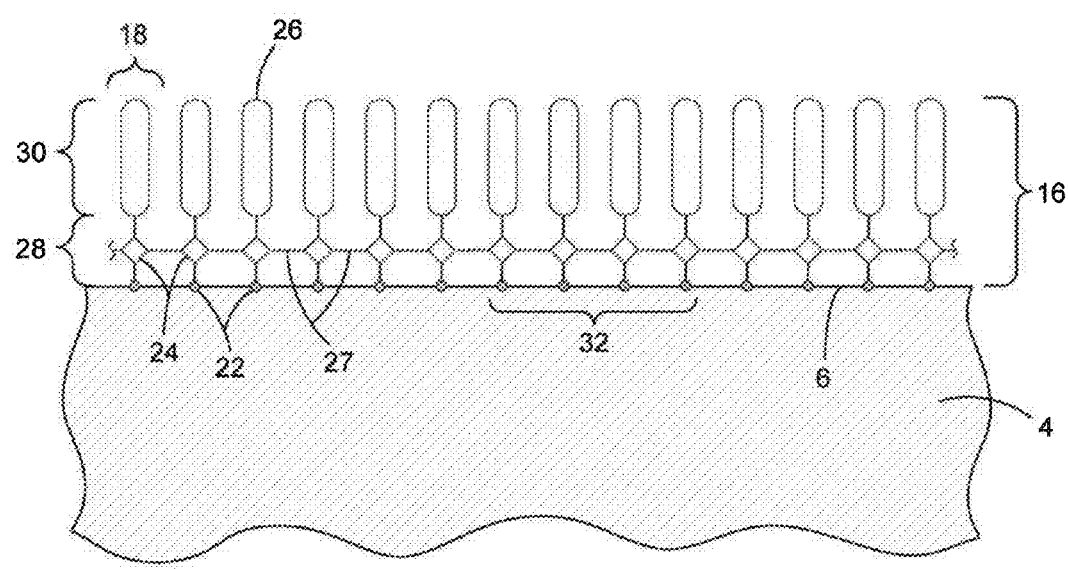
FIG. 4 illustrates one embodiment of a protective monolayer coating formed from a series of monomer units covalently bound to a surface via polar binding sites.

FIG. 4 illustrates one embodiment of a protective monolayer coating 16 formed from a series monomer units 18 covalently bonded to the optical surface 6 of an AR coating 4 via organic linking groups 24. Each monomer unit 18 contains a hydrophobic tail group 26, and self assembly of the monomer units 18 aligns the hydrophobic tail groups 26 into a hydrophobic monolayer 30. The organic linking groups 24 covalently bond the hydrophobic tail groups 26 to the surface 6 of the AR coating 4 via polar bonding sites 22. As explained above, it is believed that the pre-coating surface activation process (described below in greater detail) enhances monolayer formation by reducing non-bonding sites 23 (see FIG. 3B). Consequently, a successful pre-coating surface activation produces a relatively high surface concentration 32 of the polar bonding sites 22 on the surface 6 of the AR coating 4—which is believed to promote monolayer formation and to reduce the occurrence of multiple layers.

In some embodiments the organic linking groups 24 may polymerize to form an interconnected network 28 in which individual linking groups 24 are covalently bonded via linking group interconnections 27 as shown in FIG. 4. Embodiments employing interconnected networks 28 may impart the resulting protective monolayer coating 16 with increased durability due to increased thermodynamic stability relative to protective monolayer coatings without the linking group interconnections 27. The formation of interconnected networks 28 may also enhance monolayer formation and reduce multi-layer formation by promoting planar self assembly.

The organic linking groups 24 may be formed using a variety of organic coupling agents and functional groups capable of reacting with free hydroxide (—OH) groups. Non-limiting examples of functional groups that may be contained within the organic linking groups 24 include ether groups (e.g., —O—$CH_2$—R, —O—$CH_2$-Ph(R), —O—$CH_2$—(CO)R, —O—$CH_2$—(CO)NHR), ester groups (—O(CO)R), carbamate groups (e.g., —O(CO)NHR), and siloxane groups (e.g., —O—Si—$(R^1)_3$, —O—Si—$(R^1)_2$ $(R^2)$, —O—Si—$(R^1)(R^2)(R^3)$, $(—O)_2$—Si—$(R^1)_2$, $(—O)_2$—Si—$(R^1)(R^2)$, $(—O)_3$—Si—(R)), to name a few. The organic linking groups 24 may also contain polymeric linking groups such as polyethers, polyesters, polyurethanes and polysiloxanes (silicones), to name a few.

Figure 5A:
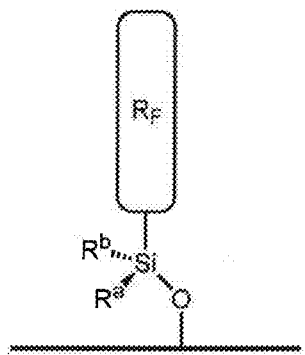
FIGS. 5A-5E illustrate different organic linking groups containing silane groups.
Figure 5B:
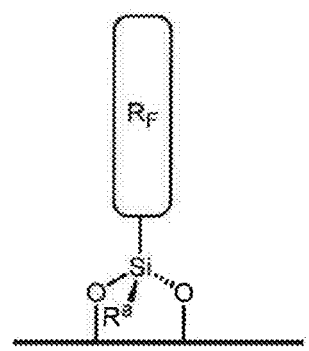
Figure 5C:
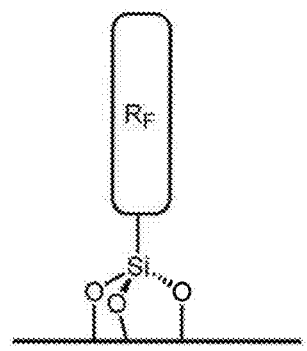
Figure 5D:
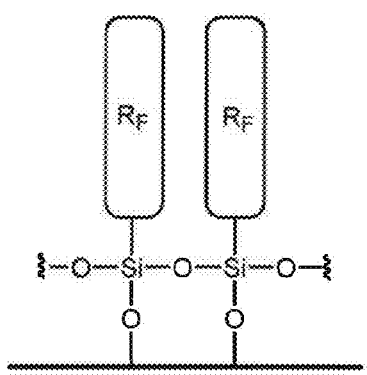
Figure 5E:
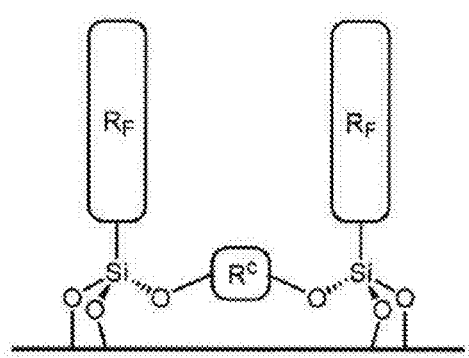

The structure and thermodynamic stability of the organic linking groups 24 can be altered tremendously depending upon the selection of the functional groups contained therein. This wide variation is illustrated in FIGS. 5A-5E which depict a number of different organic linking groups 24 containing silane groups. FIGS. 5A-5C illustrate monomer units 18 containing a single hydrophobic tail group 26 attached to silane and siloxane linking groups 24 containing a silicon atom bonded to a substrate surface through one, two or three oxygen atoms. The silicon atom may also be bonded to other organic substituents, shown as $R^a$ and $R^b$ in FIGS. 5A and 5B. FIGS. 5D and 5D illustrate interconnected polysiloxane (silicone) linking groups 24 in which adjacent monomer units 18 are interconnected by linking group interconnections 27 in the form of bridging oxygen atoms (FIG. 5D) and diol groups connected through an organic linking group $R^c$ (FIG. 5E). The illustrations depicted in FIGS. 5A-5E are merely non-limiting examples showing variability of only one class organic linking groups 24.

The non-limiting example of FIG. 6 illustrates a protective monolayer coating 16 formed from a series of monomer units 18 covalently bonded to an optical surface 6 of an AR coating 4 via an interconnected network 28 of siloxane linking groups 24 covalently bonded together via oxygen atom interconnections 27. Each monomer unit 18 contains a hydrophobic tail group 26, and self assembly of the monomer units 18 aligns the hydrophobic tail groups 26 into a hydrophobic monolayer 30. The interconnected siloxane linking groups 24 covalently bond the hydrophobic tail groups 26 to the surface 6 of the AR coating 4 via hydroxyl groups 22. As explained above, it is believed that the pre-coating surface activation process enhances monolayer formation by reducing non-bonding sites (see FIG. 3B). Consequently, a successful pre-coating surface activation produces a relatively high surface concentration 32 of the hydroxyl groups 22 on the surface 6 of the AR coating 4—which is believed to promote monolayer formation and to reduce the occurrence of multiple layers.

Protective monolayer coatings 16 of the present disclosure can be applied to protect the wide variety of optical devices and vehicles containing optically-transmissive surfaces. Suitable optically-transmissive surfaces include surfaces capable of transmitting electromagnetic radiation in a wide range of frequency ranges within the electromagnetic spectrum including, by way of non-limiting example, the visible spectrum (400 to 900 nm), the near IR spectrum (0.9 to 1.7 µm), the short-wavelength (SW) IR spectrum (1.4 to 3 µm), the mid-wavelength (MW) IR spectrum (3 to 8 µm) and the long-wavelength (LW) IR spectrum (8 to 15 µm).

Non-limiting examples of optical devices that can be protected include cameras, infrared (IR) sensors, binoculars, telescopes, periscopes, monoculars, rifle scopes, spotting scopes, rangefinders, microscopes, and night-vision goggles, to name a few. Non-limiting examples of vehicles that can be protected include ground vehicles, watercraft and aerospace vehicles. Ground vehicles may include tanks, infantry fighting vehicles, armored personnel carriers, mine-protected vehicles, light-armored vehicles, light-utility vehicles, and combat engineering vehicles, to name a few. Watercraft vehicles include ships, boats, hovercrafts, and submarines, to name a few. Aerospace vehicles include unmanned aerial vehicles, jet aircraft, helicopters, and satellites.

B. Methods of Forming Protective Monolayer Coatings

Methods for producing a protective monolayer coating 16 include the following general steps:

(A) Activating the surface to be protected;
(B) Forming an initial hydrophobic coating; and
(C) Thinning the initial hydrophobic coating to produce a final monolayer coating.

These general steps may be implemented and modified in a wide variety of ways in order to produce monolayer coatings capable of protecting different surface materials in many disparate environmental settings. As explained above, protective monolayer coatings of the present disclosure may also be applied to optical surfaces in a manner that does not adversely affect the optical performance of the resulting optical surface.

Figure 7:
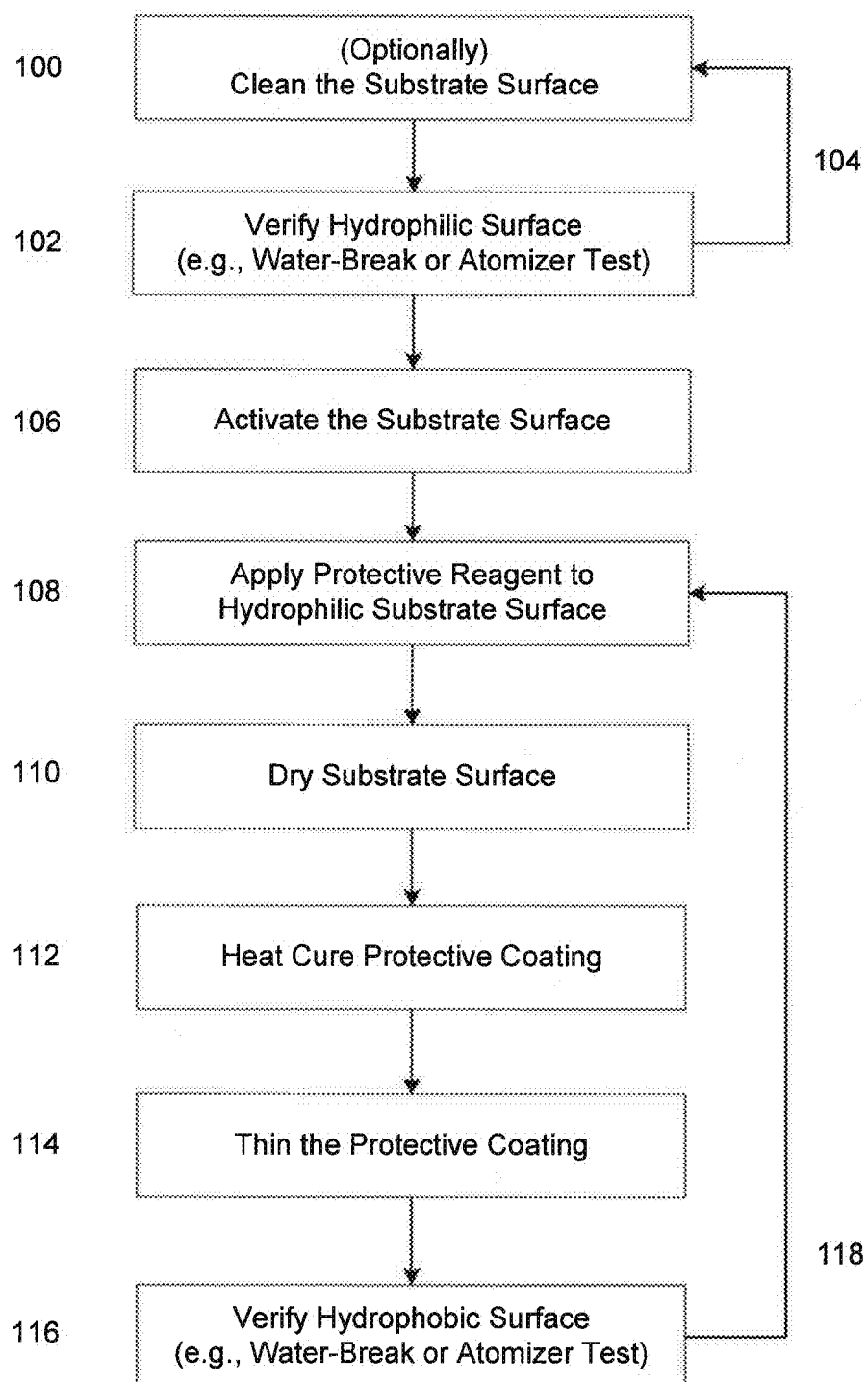
FIG. 7 is a schematic diagram illustrating one embodiment of a method for producing a protective monolayer coating.

FIG. 7 illustrates one embodiment of a method for producing a protective monolayer coating 16 as described above. The method of FIG. 7 is provided as a non-limiting example that could be used to coat a variety of surface materials including metals, glasses, ceramics, composites, plastics, and mixtures thereof. The method of FIG. 7 may be adapted and modified as necessary to produce protective monolayer coatings 16 during manufacturing of an article containing the protected surface, or during repair or modification of an article containing a coatable surface. Repair and modification methods of FIG. 7 may be carried out at specialized repair/modification facilities or may be carried out under operational (in-field) conditions in the absence of specialized facilities or equipment.

The step 100 is an optional cleaning of the substrate surface. As explained above, the surface to be protected could be a substrate surface 2 such as a metal, glass, ceramic, composite, plastic, etc., or could be a protective coating such as an AR coating 4. The optional cleaning step 100 is included in certain embodiments, such as repair scenarios, where the surface to be protected may be in contact with contaminants that need to be removed prior to the surface activation step 102.

Following the optional cleaning step 100, the effectiveness of the cleaning is evaluated by performing a water-break test on the substrate surface in step 102. Alternatively, in embodiments where no initial cleaning step 100 occurs, the method begins with the evaluation step 102 in order to assess whether a cleaning step 100 is necessary.

A water-break test detects the presence of hydrophobic (non-wetting) films and hydrophobic organic materials on the surface being tested. Some embodiments of the present disclosure employ the protocol described in ASTM F 22-13, which describes a standard test method for detecting hydrophobic surface films by the water-break test. Alternatively, some embodiments employ the protocol described in ASTM F 21-65, which describes a standard test method for detecting hydrophobic surface films by performing an atomizer test. These methods are described in further detail below. Other embodiments employ modifications of the standard test methods described in ASTM F 22-13 and ASTM F 21-65 as necessary to detect hydrophobic surface films and organic contaminants in a variety of different scenarios involving different surface materials and dimensions. In some cases the atomizer test can be advantageously used for mounted or un-mounted optical devices or windows. Methods of the present disclosure are not limited to the use of the water-break tests (or modifications thereof) described herein. Any suitable method capable of detecting the presence of hydrophobic (non-wetting) films and hydrophobic organic materials on surfaces may be employed without deviating from the present disclosure.

The water-break test, for example, is performed by withdrawing the surface to be tested, in a vertical position, from a container of purified water and observing the behavior of the water. For embodiments wherein the surface to be tested cannot be easily immersed in a container the atomizer tests may be used. The interpretation of the water-break test is based upon the pattern of wetting. Contaminated areas having a surface tension lower than water will cause the water to bead up at the location or "break" while draining. Most common film contaminants such as oils, silicones, or fluorocarbon greases have surface tensions significantly lower than water. In the absence of hydrophobic films or organic contaminants, the resulting draining water layer will remain as a film over the surface. In areas where hydrophobic materials are present on the surface, the draining water layer will break up into a discontinuous film within a short time (e.g., 1 minute).

If the water-break test in step 102 indicates the presence of hydrophobic contaminants on the surface to be protected, then step 104 involves repeating (or initiating) the surface cleaning step 100. The cleaning and evaluation steps 100 and 102 are repeated as necessary until the activated surface is a uniformly wetting surface and free of water breaks.

The step 106 is a surface activation step in which the surface to be protected is contacted with a surface activator that modifies the original surface to form a polar (hydrophilic) surface having a relative high concentration 32 of polar bonding sites 22. As explained below in greater detail, the surface activator contains a reagent that can increase the concentration of polar binding sites 22 on the surface to be protected, and an organic solvent that can remove unwanted hydrophobic films and contaminants from the surface to be protected. In some embodiments, such as manufacturing scenarios involving application of a protective monolayer coating to a virgin optical surface, the surface activation step 106 may be carried out initially without performing the optional cleaning step 100. In some embodiments in which a formerly-applied protective coating has been damaged, the surface activation step 106 may also be carried out initially to remove the damaged protective coating.

Following successful surface activation the protective monolayer coating 16 is then applied to the surface to be protected by contacting the surface with a protective reagent in step 108. The protective reagent is in the form of an aqueous or non-aqueous solution or dispersion containing a reactive compound or mixture of compounds, which can react with the polar binding sites 22 to form the organic linking groups 24 and optionally the linking group interconnections 27 (see FIG. 4). The reactive compound or mixture of compounds may be monomeric compounds or polymeric compounds capable of reacting with surface hydroxyl groups to from organic linking groups 24 containing, by non-limiting example, ether groups (e.g., —O—$CH_2$—R, —O—$CH_2$-Ph(R), —O—$CH_2$—(CO)R, —O—$CH_2$—(CO)NHR), ester groups (—O(CO)R), carbamate groups (e.g., —O(CO)NHR), and silane groups (e.g., —O—Si—$(R^1)_3$, —O—Si—$(R^1)_2(R^2)$, —O—Si—$(R^1)(R^2)(R^3)$, $(—O)_2$—Si—$(R^1)_2$, $(—O)_2$—Si—$(R^1)(R^2)$, $(—O)_3$—Si—$(R)$), to name a few. A wide variety of protective reagents may be employed in the step 108, including commercially-available coating reagents.

Following application of the protective reagent in step 108, the covered surface is then dried in step 110 for a predetermined period of time. The drying step 110 may occur in a controlled atmosphere or may occur in an ambient atmosphere. The drying step 110 may occur at ambient temperature or may occur at a predetermined temperature less than ambient temperature or greater than ambient temperature. In some embodiments, when the drying step 110 occurs at a predetermined temperature greater than ambient temperature, the predetermined temperature may be different than a predetermined temperature employed in step 112 described below.

The predetermined period of time in step 110 ranges from about 1 minute to about 200 hours depending upon the drying temperature, humidity, and the nature of the protective reagent and the surface being protected. In some embodiments the period of time for the drying step 110 ranges from about 5 hours to 30 hours. In other embodiments the period of time for the drying step 110 ranges from about 15 hours to about 25 hours. Predetermined temperatures for the drying step 110 may range from about 0° C. (32° F.) to about 40° C. (105° F.). The predetermined temperature may be static temperature that does not change or may be a variable temperature that is increased or decreased during the predetermined period of time. In some embodiments the predetermined temperatures range from about 10° C. (50° F.) to about 32° C. (90° F.). In other embodiments the predetermined temperature ranges from about 21° C. (70° F.) to about 29° C. (85° F.).

Following the drying step 110, the resulting dried surface is heat cured at a predetermined temperature and a predetermined humidity for a predetermined period of time in step 112. The heat curing step 112 may occur in an oven set to maintain a predetermined temperature or temperature range, or may occur outside of an oven using an external heat source (such as an infrared heat lamp, a convection oven, or an air-circulating device) such that the surface temperature and humidity is monitored to maintain a predetermined temperature or temperature range and a predetermined humidity or humidity range. The predetermined temperature of the heat curing step 112 ranges from about 30° C. (85° F.) to about 100° C. (212° F.) depending upon the nature of the protective reagent and the surface to be protected. The predetermined temperature may be static temperature that does not change or may be a variable temperature that is increased or decreased during the predetermined period of time. In some embodiments the predetermined temperature of the heat curing step 112 ranges from about 38° C. (100° F.) to about 66° C. (150° F.). In other embodiments the predetermined temperature of the heat curing step 112 ranges from about 50° C. (122° C.) to about 57° C. (135° F.).

The predetermined humidity of the heat curing step 112 ranges from about 50% to about 80% depending upon the nature of the protective reagent and the surface to be protected. The predetermined humidity may be static humidity that does not change or may be a variable humidity that is increased or decreased during the predetermined period of time. The predetermined period of time for the heat curing step 112 ranges from about 1 minute to about 100 hours depending upon the nature of the protective reagent and the surface to be protected. In some embodiments the predetermined period of time for the heat curing step 112 ranges from about 50 minutes to about 5 hours. In other embodiments the predetermined period of time for the heat curing step 112 ranges from about 120 minutes to about 300 minutes.

Following the heat curing step 112, the resulting cured surface is contacted in step 114 with a thinning agent that enhances monolayer formation by physically and/or chemically removing additional (outer) layers and contaminants (such as residual remnants of the protective reagent) that can become bound (through covalent or non-covalent interactions) to the monolayer, or are otherwise associated with (e.g., solubilized by) the monolayer, during the steps 108, 110 and 112. As explained below in greater detail, the thinning agent contains a reagent that can sever inter-layer bonding/interaction sites 25 (see FIG. 3C) to remove the outer layers of multi-layered portions 17 of the protective coatings, and can also solubilize and remove both the severed layers and other residual contaminants from the surface to produce the desired monolayer protective coatings 16.

Following the thinning step 114, the effectiveness of the coating steps 108, 110, 112 and 114 is evaluated by performing a water-break test on the coated surface in step 116. As with the water-break test in step 104, the test in step 116 may be conducted using the protocols described in ASTM F 22-13 and ASTM F 21-65. Other embodiments employ modifications of the standard test methods described in ASTM F 22-13 and ASTM F 21-65 as necessary to determine whether the coating steps have produced a uniformly non-polar (hydrophobic) surface. Unlike the water-break test in step 104, the test in step 116 indicates a successful coating of the surface when the water applied to the surface beads up or "breaks" while draining-without wetting the protected surface. Such testing for the presence of hydrophobicity is sometimes referred to as a "reverse" water break test. In areas where the protective monolayer coating 16 has been successfully applied, the draining water layer will break up into beads within a short time (e.g., 1 minute).

Methods of the present disclosure are not limited to the use of the water-break tests (or modifications thereof) described herein. Any suitable method capable of detecting the presence of hydrophobic (non-wetting) films and hydrophobic organic materials on surfaces may be employed without deviating from the present disclosure.

If the water-break test of step 116 indicates the presence of hydrophilic (polar) areas on the coated surface, then step 118 involves repeating the coating steps 108, 110, 112, 114 and 116. The coating steps 108, 110, 112, 114 and 116 are repeated as necessary until the coated surface in a uniformly non-polar (hydrophobic) surface free from polar (hydrophilic) portions.

Surfaces that are successfully coated using the method illustrate in FIG. 7 may contain a protective monolayer coating 16 that is both hydrophobic and oleophobic in nature. Hydrophobicity is often associated with oleophilicity, which is the affinity of a substance for oils. The hydrophobic and oleophilic effect can be differentiated and controlled based in part on the selection of the conditions employed in the surface activation step 102 and the coating step 108. In some embodiments wherein the protective monolayer coatings 16 are formed from protective reagents containing fluorinated long-chain alkyl silanes, the protective monolayer coatings 16 may be both hydrophobic and oleophobic in their wetting characteristics.

The optional cleaning step 100 may be a single-step cleaning, a two-step cleaning, or a multi-step cleaning. For example, the optional cleaning step may involve a first cleaning using a gross cleaner followed by a second cleaning using a fine cleaner. In other embodiments the optional cleaning step 100 may only include the use of a fine cleaner.

The purpose of the optional gross cleaner is to remove gross impurities attached to the surface to be protected. Such impurities may be present in certain embodiments wherein the surface to be protected has been exposed to environmental conditions involving the presence of biological or chemical contaminants as well as dirt and residues deposited through human contact or exposure to the outdoors. Gross cleaners may include commercial detergents such as Dawn®, Palmolive®, Ajax®, and the like, which may be used in a concentrated (commercially-available) form or may be diluted in water or organic solvents to form detergent solutions. The gross cleaner may be applied to the surface with an applicator (such as a cotton applicator, cotton ball, cotton pad, or natural fiber pad, containing no lubricants or surfactants) using hand application or in-line processing. Following gross cleaning, a surface to be protected may then be rinsed with purified water to remove any residual gross cleaner.

The optional fine cleaner may include alkaline cleaners containing inorganic salts such as, by non-limiting example, phosphates, silicates, carbonates and borates formulated in aqueous solutions. Non-limiting examples of phosphate salts may include orthophosphates and complex phosphates. Orthophosphates include metal salts such as, for example, trisodium phosphate ($Na_3PO_4$) and disodium phosphate ($Na_2HPO_4$) in either hydrated or non-hydrated forms. Complex phosphates have lower alkalinity than orthophosphates such as trisodium phosphate and include, by non-limiting example, tetrasodium pyrophosphate ($Na_4P_2O_7$), sodium tripolyphosphate ($Na_5P_3O_{10}$), sodium tetraphosphate ($Na_6P_4O_{13}$) and sodium hexametaphosphate ($NaPO_3)_6$). Silicate salts may include metal silicates such as, by non-limiting example, sodium metasilicate ($Na_2SiO_3$) and potassium metasilicate ($K_2SiO_3$). Carbonate salts may include metal carbonates such as, by non-limiting example, sodium carbonate ($Na_2CO_3$) and potassium carbonate ($K_2CO_3$). Borate salts may include metal borates such as, by non-limiting example, sodium perborate ($NaBO_3$) in its various hydrated forms (e.g., $NaBO_3.H_2O$, $NaBO_3.3H_2O$ and $NaBO_3.4H_2O$).

In some embodiments employing the optional cleaning step 100 using a fine cleaner, the cleaning effect can be improved by applying the fine cleaner as a solution at an elevated temperature. In one embodiment, by non-limiting example, a solution of sodium metasilicate ($Na_2SiO_3$) in water is warmed to a temperature ranging from about 24° C. (75° F.) to about 66° C. (150° F.). In other embodiments the fine cleaner solution may be warmed to a temperature ranging from about 45° C. (113° F.) to about 57° C. (135° F.), or from about 49° C. (120° F.) to about 66° C. (150° F.). Following warming the fine cleaner solution is then applied to the surface to be protected at the elevated temperature.

The fine cleaner may be applied to the surface with an applicator (such as a cotton applicator, cotton ball, cotton pad, or nature fiber pad, containing no lubricants or surfactants) using hand application or in-line processing. Following fine cleaning, a surface to be protected may then be rinsed with purified water to remove any residual fine cleaner.

The surface activator used in the surface activation step 106 contains a reagent that can increase the concentration of polar bonding sites 22 (see FIG. 4) on the surface to be protected and an organic solvent that can remove unwanted hydrophobic films and contaminants from the surface. In some embodiments the surface activator comprises: (i) a fluoride-containing reagent; and (ii) an organic solvent. In other embodiments the surface activator is an aqueous mixture comprising: (i) a fluoride-containing reagent; and (ii) an organic solvent; and (iii) water. In still other embodiments the surface activator comprises: (i) a fluoride-containing compound; (ii) an acid; and (iii) an organic solvent. In other embodiments the surface activator comprises: (i) a fluoride-containing compound; (ii) an acid; (iii) an organic solvent; and (iv) water. In some embodiments the surface activator may also contain an anionic surfactant.

Non-limiting examples of fluoride-containing compounds that may be contained in the fluoride-containing reagent include barium fluoride ($BaF_2$), hydrogen fluoride (HF), ammonium fluoride ($NH_4F$), sodium fluoride (NaF), sodium bifluoride ($NaHF_2$), potassium fluoride (KF), potassium bifluoride ($KHF_2$), ammonium difluoride ($NH_4HF_2$), to name a few, as well as mixtures of fluoride-containing compounds. Such fluoride-containing compounds may be used in either anhydrous or hydrated forms.

Non-limiting example of acids that may be contained in the fluoride-containing reagent include hydrochloric acid (HCl), sulfuric acid ($H_2SO_4$), nitric acid ($HNO_3$), hydrobromic acid (HBr), hydoiodic acid (HI), chloric acid ($HClO_3$), perchloric acid ($HClO_4$), formic acid (HCOOH), acetic acid ($CH_3COOH$), trichloroacetic acid ($Cl_3CCOOH$), hydrofluoric acid (HF), nitrous acid ($NHO_2$), sodium hydrogen sulfate ($NaHSO_4$) and potassium hydrogen sulfate ($KHSO_4$), to name a few, as well as mixtures of acids.

Organic solvents that may be contained in the surface activator include polar aprotic solvents and polar protic solvents as these terms are commonly understood in the relevant art. Organic solvents such as dimethylsulfoxide (DMSO), dimethylformamide (DMF) and acetonitrile are considered to be polar aprotic solvents; whereas organic solvents such as ethanol, isopropanol and acetic acid are considered to be polar protic solvents.

Non-limiting examples of organic solvents that may be contained in the surface activator include methanol, ethanol, formic acid, n-butanol, isopropanol, 2,2,2-tribromoethanol, 2,2,2-trichloroethanol, 2,2,2-trifluoroethanol, 2,2-dichloroethanol, 2-chloroethanol, 2-fluoroethanol, 2-nitroethanol, 1,1,1,3,3,3-hexafluoro-2-propanol, 2,2,3,3,3-pentafluoro-1-propanol, 2,2,3,3-tetrafluoro-1-propanol, 1,1,1-trifluoropropanol, 3,3,3-trifluoro-1-propanol, 1,3-difluoro-2-propanol, 1,3-dichloro-2-propanol, 3-fluoro-1-propanol, 2-pentanol, 2-methyl-1-butanol, 2,2-dimethyl-1-propanol, 2-methyl-1-butanol, 3-methyl-2-butanol, 3-pentanol, 1-ethoxyl-2-propanol, 1-methoxy-2-butanol, 1-methoxy-2-methyl-propanol, 2-isopropoxyethanol, 3-ethoxy-1-propanol, 3-methoxy-1-butanol, 2-butoxyethanol, 1-methoxy-2-butanol, 1-methoxy-2-methyl-2-propanol, 2-isopropoxyethanol, 3-ethoxy-1-propanol, 3-methoxy-1-butanol, 1,1-dimethoxy-2-propanol, 2-(methoxymethoxy)-1-propanol, cyclohexanol, cyclopentanemethanol, 2-methylcyclopentanol, 1-hexanol, 2,3-dimethyl-2-butanol, 2-ethyl-1-butanol, 2-hexanol, 2-methyl-1-pentanol, 2-methyl-2-pentanol, 2-methyl-3-pentanol, 3,3-dimethyl-1-butanol, 3,3-dimethyl-2-butanol, 3-hexanol, 3-methyl-1-pentaol, 3-methyl-2-pentanol, 3-methyl-3-pentanol, 4-methyl-1-pentanol, 4-methyl-2-pentanol, 3-methoxy-3-methyl-1-butanol, 1,1,1,3,3,3-hexafluoro-2-phenyl-2-propanol, 3,5-bus(trifluoromethyl)benzyl alcohol, 2-(trifluoromethyl)-phenethyl alcohol, 3-(trifluoromethyl)phenethyl alcohol, 4-(trifluoromethyl)phenethyl alcohol, 2-[4-(trifluoromethoxy)phenyl]ethanol, 2-hydroxymethyl-1,4-benzodioxane, 3,4-(methylenedioxy)phenethyl alcohol, 3-(4-chlorophenyl)1-propanol, 2-phenyl-2-propanol, benzyl alcohol, 3,4-dimethylbenzyl alcohol, 1-phenoxy-2-propanol, 2-(4-methylphenoxy)ethanol, 2-(benzyloxy)ethanol, 2-ethoxy-4-methylphenol, 2-ethoxybenzyl alcohol, 2-methoxy-2-phenylethanol, 2-methoxyphenethyl alcohol, 3-(4-hydroxyphenyl)1-propanol, 3-thoxybenzyl alcohol, 3-methoxyphenethyl alcohol, and 4-methoxyphenethyl alcohol, to name a few, as well as mixtures of organic solvents.

Non-limiting examples of anionic surfactants that may be contained in the surface activator include ammonium lauryl sulfate, dioctyl sodium sulfosuccinate, potassium lauryl sulfate, sodium dodecyl sulfate, sodium dodecylbenzenesulfonate, sodium lauryl sulfate, sodium lauroyl sarcosinate, sodium myreth sulfate, sodium pareth sulfate, and sodium stearate, to name a few, as well as mixtures of anionic surfactants.

In some embodiments the surface activator comprises: (i) about 0.1-10% by volume of a fluoride-containing compound; (ii) about 0.1-10% by volume of an acid; and (iii) about 1-10% by volume of an organic solvent. In some embodiments the surface activator comprises: (i) about 0.1-10% by volume of a fluoride-containing compound; (ii) about 0.1-10% by volume of an acid; (iii) about 1-10% by volume of an organic solvent; and (iv) water. In still other embodiments the surface activator consists of: (i) about 0.1-10% by volume of a fluoride-containing compound; (ii) about 0.1-10% by volume of an acid; (iii) about 1-10% by volume of an organic solvent; and the balance is (iv) water. In other non-limiting embodiments the surface activator comprises: (i) about 0.1-10% by volume of a fluoride-containing compound; (ii) about 0.1-10% by volume of an acid; (iii) about 1-10% by volume of an organic solvent; (iv) about 0.1-5% by volume of an anionic surfactant; and (v) water. In still other embodiments the surface activator consists of: (i) about 0.1-10% by volume of a fluoride-containing compound; (ii) about 0.1-10% by volume of an acid; (iii) about 1-10% by volume of an organic solvent; (iv) about 0.1-5% by volume of an anionic surfactant; and the balance is (v) water.

By way of non-limiting examples, in some embodiments the surface activator comprises: (i) about 0.1-5% by volume of hydrofluoric acid (HF); (ii) about 0.1-5% by volume of sulfuric acid ($H_2SO_4$); (iii) about 1-10% by volume of 2-butoxyethanol; and (iv) water. In other embodiments the surface activator comprises: (i) about 0.1-2.5% by volume of hydrofluoric acid (HF); (ii) about 0.1-2.5% by volume of sulfuric acid ($H_2SO_4$); (iii) about 0.1-2.5% by volume of 2-butoxyethanol; (iv) about 0.1-5% by volume of an anionic surfactant; and (v) water.

The pH of the activator solution in some embodiments ranges from about 1 to 9. In other embodiments the pH of the activator solution ranges from about 5 to 9, while in other embodiments the pH ranges from about 5.1 to 6.9. In still other embodiments the pH of the activator solution ranges from about 1.7 to 2.3.

In one non-limiting example the surface activator comprises: (i) 1.4% by volume of hydrofluoric acid (HF); (ii) 1.0% by volume of sulfuric acid ($H_2SO_4$); (iii) 1.5% by volume of ethanol; and (iv) water. In another non-limiting example the surface activator consists of: (i) 1.4% by volume of hydrofluoric acid (HF); (ii) 1.0% by volume of sulfuric acid ($H_2SO_4$); (iii) 1.5% by volume of ethanol; and the balance is (iv) water. In another non-limiting example the surface activator comprises: (i) 1.4% by volume of hydrofluoric acid (HF); (ii) 1.0% by volume of sulfuric acid ($H_2SO_4$); (iii) 1.5% by volume of 2-butoxyethanol; (iv) 0.1% by volume of sodium lauryl sulfate; and (v) water. In still another non-limiting example the surface activator consists of: (i) 1.4% by volume of hydrofluoric acid (HF); (ii) 1.0% by volume of sulfuric acid ($H_2SO_4$); (iii) 1.5% by volume of 2-butoxyethanol; (iv) 0.1% by volume of sodium lauryl sulfate; and the balance is (v) water.

The protective reagent used in the coating step 108 is in the form of an aqueous or non-aqueous solution or dispersion containing a reactive compound or mixture of compounds, which can react with the polar binding sites 22 to form the organic linking groups 24 and optionally the linking group interconnections 27 (see FIG. 4). The reactive compound or mixture of compounds may include small-molecule reagents or polymeric reagents capable of reacting with surface hydroxyl groups to from organic linking groups 24 containing, by non-limiting example, ether groups (e.g., —O—$CH_2$—R, —O—$CH_2$-Ph(R), —O—$CH_2$—(CO)R, —O—$CH_2$—(CO)NHR), ester groups (—O(CO)R), carbamate groups (e.g., —O(CO)NHR), and silane groups (e.g., —O—Si—$(R^1)_3$, —O—Si—$(R^1)_2(R^2)$, —O—Si—$(R^1)(R^2)(R^3)$, $(—O)_2$—Si—$(R^1)_2$, $(—O)_2$—Si—$(R^1)(R^2)$, $(—O)_3$—Si—(R)), to name a few. A wide variety of protective reagents may be employed in the step 108, including all commercially-available coating reagents and systems for coating metals, glasses, ceramics, composites, plastics, wood, and fibers, to name a few non-limiting examples.

Persons of ordinary skill in the relevant art will appreciate that the activated surface may be coated using a large variety of coating reagents and systems known in the art for coating polar functional groups including hydroxyl groups. Non-limiting examples of suitable reagents include: alkyl halides (e.g., Br—$CH_2$—R, Br—$CH_2$-Ph(R), Br—$CH_2$—(CO)R, Br—$CH_2$—(CO)NHR, etc.), which can be used to produce ether-containing linking groups; carboxylic acids and derivatives thereof (e.g., HO(CO)R, MeO(CO)R, Cl(CO)R, etc.), which can be used to produce ester-containing linking groups; isocyanates (e.g., OCN—R, etc.), which can be used to produce carbamate-containing linking groups; silanes (e.g., MeO—Si—$(R^1)_3$, MeO—Si—$(R^1)_2(R^2)$, MeO—Si—$(R^1)(R^2)(R^3)$, $(MeO)_2$—Si—$(R^1)_2$, $(MeO)_2$—Si—$(R^1)(R^2)$, $(MeO)_3$—Si—R, etc.), which can be used to produce silane-containing linking groups; and mixtures of coating reagents.

As explained above, in some embodiments the protective monolayer coating 16 may be formed of organic linking groups 12 containing siloxane groups. In such embodiments the silane-containing protective reagent can be selected to produce a large variety of linking group structures including, by non-limiting example, the non-interconnected embodiments illustrated in FIGS. 5A-5C, and the interconnected embodiments illustrated in FIGS. 5D and 5E. In some embodiments the presence of linking group interconnections 27 may be advantageous in providing protective monolayer coatings 16 offering improved durability and protection to a variety of different surface materials under adverse environmental conditions. For example, the protective monolayer coating 16 illustrated in FIG. 6 may offer improved durability and protection in some non-limiting embodiments due to the presence of the interconnected network 28 of siloxane linking groups 24 covalently bonded together via the oxygen atom interconnections 27 (see also FIG. 5D).

increase the rate of coating formation. Such catalysts promote the reaction between the hydrolysable groups of the silane and the polar bonding sites on the surface to be protected. Non-limiting examples of catalytic compounds include acids, bases, metal salts or organic acids (e.g., dibutyl tin dioctoate, iron stearant, lead octoate), titanate esters (e.g., tetraisopropyl titanate, tetrabutyl titanate), and chelate compounds (e.g., acetyl-acetonato titanium), to name a few, as well as mixtures of catalysts.

Silane-containing coating reagents may be prepared or purchased as small-molecule silane reagents, polymer-functionalized silane reagents or silicones, which may be applied Scheme A

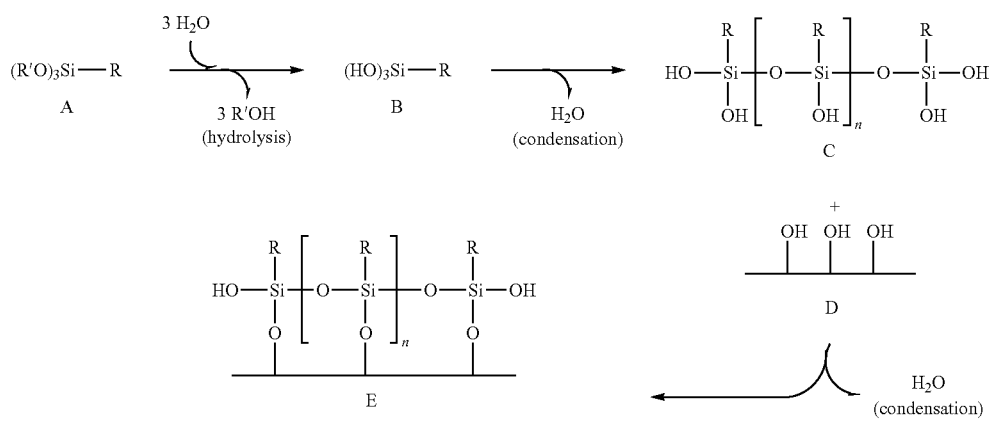

Interconnected siloxane linking groups 24, as exemplified in FIG. 6, may be produced using a variety of different silane-containing protective reagents and systems known in the relevant field. Organo-functionalized alkoxysilanes, for example, are known to react with surface hydroxides in the presence of water to form interconnected polysiloxanes by undergoing a series of hydrolysis and condensation reactions. Scheme A (above) illustrates one commonly-accepted mechanistic pathway for this process, in which an organo-trialkoxysilane (A) is hydrolyzed to form a silanol (B) which can then undergo polycondensation to form a polysiloxane (silicone) (C). The silicone (C) may then interact with surface hydroxyl groups (D) (generally through initial hydrogen bonding interactions) and undergo a further condensation to form an interconnected polysiloxane coating (E) in which the "R" groups may be hydrophobic tail groups 26 (see FIG. 6).

It will be recognized by persons skilled in the relevant art that the exact ordering and nature of the hydrolysis and condensation reactions illustrated in Scheme A may in fact be different depending upon the silane-containing reagents employed as well as the reaction conditions and nature of the surface being protected. Furthermore, the silane-containing reagent applied to the surface can be in any form ranging from the alkoxy silane (A) (or other reactive derivatives thereof), the silanol (B), or the silicone (C). Commercial silane coating reagents and systems are available in a variety of forms including the silanes (A) and (B) as well as the silicone (C) shown in Scheme A.

Formation of polysiloxanes may also occur in the absence of, or presence of, catalysts known in the relevant art to to the activated surface in the form of aqueous solutions, dispersions, or as non-aqueous solutions.

Non-limiting examples of small-molecule silane reagents include alkyl-substituted alkoxysilanes such as methyl trimethoxysilane (XIAMETER OFS-6070®), methyl triethoxysilane (DC 1-6383®), dimethyl dimethoxysilane (XIAMETER OFS-6194®), propyl trimethoxysilane (DC Z-6265®), isobutyl trimethoxysilane (XIAMETER OFS-2306®), phenyl trimethoxysilane (XIAMETER OFS-6124®), and n-octyl triethoxysilane (XIAMETER OFS-6341®), to name a few, as well as mixtures thereof.

Persons skilled in the relevant field will recognize that a wide variety of small-molecule silane reagents may be prepared or purchased such that the organic substituent(s) attached to the silicon atom may be altered tremendously in terms of the size, shape, and properties (e.g., reactivity, polarity, wetting characteristics, etc.). The same is true for the polymer-functionalized silane reagents and silicones described below. As illustrated in FIGS. 4 and 6, it will also be recognized that the size, shape and properties of the organic substituent(s) can greatly affect both the dimensions and the physical properties of the resulting protective monolayer coating 16 by defining the size, shape and properties of the hydrophobic tail groups 26.

Suitable small-molecule silane reagents may also include reactive silanes containing reactive functional groups such as amino groups (e.g., aminopropyltriethoxy silane (DC Z-6011®)), methacrylate groups (e.g., γ-methacryloxypropyltrimethoxysilane (XIAMETER OFS-6030®)), epoxy groups (γ-glycidooxypropyltrimethoxysilane (XIAMETER OFS-6040®)), vinyl groups (vinyltrimethoxysilane (DC Z-6300®)), mercapto groups (mercaptopropyl-trimethoxysilane (DC Z-6910®)), isocyanate groups (3-isocyanatepropyl trimethoxysilane (SISIB PC2710®)), and ureido groups (γ-ureidopropyl-triethoxysilane (DC Z-6675®)), to name a few non-limiting examples.

These and other organofunctional alkoxysilanes may act as crosslinking agents during the coating step 108 allowing additional polymers to be grafted onto the functional silane to form unique polymeric hydrophobic tail groups 26. In such cases the protective reagent contains a mixture of the organofunctional alkoxysilane and at least one grafting polymer. Non-limiting examples of polymers that may be used as grafting polymers include polyamides (PA), polyimides (PI), polyethersulfones (PES, PSU, PPSU), polyphenylenesulfides (PPS), polyether ether ketones (PEEK), polyetherimides (PEI), polyurethanes, polyesters, polyolefins, polytetrafluoroethylenes (PTFE), fluorinated ethylene polyethylene (FEP) copolymers, perfluoroalkoxy (PFA) polymers, polyvinylidine fluorides (PVDF), polyvinyl fluorides (PVF), ethlyene-chlorotrifluoro-ethylene (E-CTFE) copolymers, and chlorotrifluoroethylene (CTFE) polymers, to name a few.

Although the silane reagents illustrated above all contain alkoxy leaving groups, suitable small-molecule silane reagents, polymer-functionalized silane reagents, and silicone reagents may contain other leaving groups such as amines, halides and esters. In general the reactivity of hydroxyl group-containing surfaces with organofunctional silanes decreases in the order: $Si-NR_2>Si-Cl>Si-NH-Si>Si-O_2CCH_3>Si-OCH_3>Si-OCH_2CH_3$. Although most of the silane reagents illustrated above contain three leaving groups (i.e., trialkoxy groups), suitable small-molecule silane reagents, polymer-functionalized silane reagents, and silicone reagents may contain fewer leaving groups—e.g., trimethoxysilanes $(R-Si-(O-CH_3)_3)$, dimethoxysilanes $((R)_2-Si-(O-CH_3)_2)$, and methoxysilanes $((R)_3-Si-O-CH_3)$.

Suitable silane-containing protective reagents also include fluoroalkylsilanes of the general formula $A_n$-Si-$B_{4-n}$, where: A is a fluorinated group; B is a halogen atom (e.g., Cl, Br), an ester group (e.g., $-O-C(O)-CH_3$), an amino group (e.g., $-NR_2$), an alkoxy group (e.g., $-OCH_3$, $-OCH_2CH_3$), or another suitable leaving group; and n represents the integer 1 or 2. Non-limiting examples of the fluorinated group A include partially fluorinated alkyl groups, perfluoroalkyl groups $(R_F)$, partially-fluorinated polyether groups, and perfluoroalkyl-terminated perfluoropolyether groups, to name a few. Non-limiting examples of fluorinated silane mononers include tridecafluorotetrahydrooctyltrichlorosilane (Gelest 8174), trifluoro-propyl-trichloro-silane (Gelest SIT8371.0), (heptadecafluoro-1,1,2,2-tetrahydrodecyl) trichlorosilane (Gelest SIH5841.0), and (heptadecafluoro-1,1,2,2-tetrahydrodecyl)triethoxyl-silane (Gelest SIH5841.5), to name a few.

In some embodiments the silane-containing protective reagent is a silane-functionalized perfluoropolyether (SF-PFPE) having the formula (I):

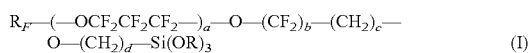

(I)

wherein: $R_F$ represents a straight chain or branched perfluorinated alkyl group having 1 to 20 carbon atoms; R represents a $C_1$-$C_{10}$ alkyl group; "a" represents an integer of 1 to 200; "b" represents an integer of 0 to 10; "c" represents an integer of 0 to 10; and "d" represents an integer of 0 to 8. One non-limiting example of a silane-functionalized perfluoropolyether falling within the scope of formula (I) is poly[oxy(1,1,2,2,3,3-hexafluoro-1,3-propanediyl)], α-(heptafluoropropyl)-ω-[1,1,2,2-tetrafluoro-3-(2-propenyloxy) propoxy) (DOW CORNING® 2634, DOW CORNING® 2700).

Small-molecule silane reagents and polymer-functionalized silane reagents, as described above, may be contained in the protective reagent as solutions in organic solvents or as aqueous emulsions or dispersions. Suitable organic solvents include non-polar solvents, polar aprotic solvents, and polar protic solvents that are non-reactive with the silane reagents. Non-limiting examples of organic solvents include aliphatic alcohols (e.g., methanol, ethanol, isopropanol), ketones (e.g., acetone, methyl ethyl ketone), esters (e.g., ethyl acetate, methyl formate), ethers (e.g., diethyl ether, diisopropyl ether, methyl t-butyl ether, dipropylene glycol monomethyl ether (DPM)), hydrocarbons including alkanes (e.g., heptane, decane) and paraffinic solvents, fluorinated hydrocarbons (e.g., perfluorohexane, perfluorooctane), partially fluorinated hydrocarbons (e.g., pentafluorobutane), and hydrofluoroethers (e.g., methyl perfluorobutyl ether, ethyl perfluorobutyl ether, ethyl perfluoroisobutyl ether, ethyl perfluoro-n-butyl ether), to name a few, as well as mixtures of organic solvents.

The concentration of the silane reagents in some embodiments may range from about 0.001% by weight to about 80% by weight, relative to a total weight of a solution or mixture containing the silane reagents. In other embodiments the concentration may range from about 0.005 to about 70% by weight, or from about 0.01 to about 60% by weight. In still other embodiments the concentration may range from about 0.1 to about 50% by weight, or from about 1 to about 30% by weight.

Some embodiments employ wet coating methods using silicone emulsions or dispersions in water. Silicones are polysiloxanes having the general structure:

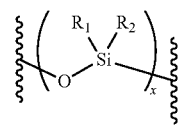

in which the $R_1$ and $R_2$ substituents may the same or different and may be altered from subunit to subunit to form copolymers.

Some embodiments may employ relatively simple homopolymer silicone disperions such as dimethicone $(-(-O-Si-(Me)_2-)_x-)$ (e.g., DC 365®, DC AF EMULSION®, DC 24 EMULSION®), in which the $R_1$ and $R_2$ groups are not altered from subunit to subunit. Other embodiments may employ more complex silicone dispersions such as amino-functional dimethylsiloxane copolymers (e.g., DC 4-4159®) and multi-component silicone release coating systems (SYL-OFF EM 7979®). Functionalized siloxane copolymers may include reactive functional groups such as vinyl groups $(Si-CHCH_2)$, hydride groups $(Si-H)$, silanol groups $(Si-OH)$, amino groups (e.g., $Si-CH_2-CH_2-CH_2-NH_2$), epoxy groups (e.g., $Si-CH_2-CH_2$-epoxy), and multi-functional groups (e.g., $H_3C-O-Si-CH_2-CH_2-CH_2-NH_2$), to name a few non-limiting examples.

Both homopolymeric and copolymeric silicones (with or without reactive functional groups) may also be used as crosslinking agents during the coating step 108, as described above, allowing additional polymers to be grafted onto the functional silane to form unique polymeric hydrophobic tail groups 26. In such cases the protective reagent contains a mixture of the silicone (often, but not exclusively, in the form of an aqueous emulsion) and a grafting polymer. Non-limiting examples of polymers that may be used as grafting polymers include polyamides (PA), polyimides (PI), polyethersulfones (PES, PSU, PPSU), polyphenylenesulfides (PPS), polyether ether ketones (PEEK), polyetherimides (PEI), polyurethanes, polyesters, polyolefins, polytetrafluoroethylenes (PTFE), fluorinated ethylene polyethylene (FEP) copolymers, perfluoroalkoxy (PFA) polymers, polyvinylidine fluorides (PVDF), polyvinyl fluorides (PVF), ethlyene-chlorotrifluoro-ethylene (E-CTFE) copolymers, and chlorotrifluoroethylene (CTFE) polymers, to name a few.

In some embodiments the protective reagent is a composition comprising a perfluoropolyether (PFPE) terminated with a reactive silane end group. By way of non-limiting example, in some embodiments the composition comprises: (i) 10-30% by weight of a perfluoropolyether-functional trialkoxysilane; (ii) 3.0-7.0% by weight of a perfluoropolytrimethylenoxide; and (iii) 40-70% by weight of a fluorinated organic solvent.

In other embodiments the protective reagent is a composition comprising an aqueous silicone dispersion and a grafting polymer. By way of non-limiting example, in some embodiments the composition comprises: (i) 25-35% by volume of an aqueous silicone dispersion; (ii) 55-75% by volume of a grafting polymer; and (iii) 1-2% by volume of a polymer binder. By way of non-limiting example, in some embodiments the composition comprises: (i) 25-35% by volume of an aqueous silicone dispersion; (ii) 55-75% by volume of a polytetrafluoroethylene (PTFE); and (iii) 1-2% by volume of a polymer binder.

In other embodiments the protective reagent is a composition comprising a fluorosilicone. By way of non-limiting example, in some embodiments the composition comprises: (i) 90-95% by volume of a fluorosilicone; and (ii) 10-20% by volume of a polymer binder.

Some of the small-molecule silane reagents, polymer-functionalized silane reagents, and silicones, as described above, are commercially available from suppliers such as Dow Corning, Henkel, Hysol, Polyplex, Inc., Sant-Gobain, Masterbond, Wacker, Gelest, and Solvay, to name a few—but none of the embodiments are limited to commercial reagents or to any particular supplier in this category.

The thinning agent used in the step 114 contains a reagent that can sever inter-layer bonding/interaction sites 25 (see FIG. 3c) to remove the outer layers of multi-layered portions 17 of the protective coatings, and can also solubilize and remove both the severed layers and other residual contaminants from the protected surface to produce the desired monolayer protective coatings 16. In some embodiments the thinning agent comprises: (i) a fluoride-containing reagent; (ii) an anionic surfactant; and (iii) water. In other embodiments the thinning agent comprises: (i) hydrofluoric acid (HF); (ii) aqueous ammonia; and (iii) an anionic surfactant.

Non-limiting examples of fluoride-containing compounds that may be contained in the fluoride-containing reagent include barium fluoride ($BaF_2$), hydrogen fluoride (HF), ammonium fluoride ($NH_4F$), sodium fluoride (NaF), sodium bifluoride ($NaHF_2$), potassium fluoride (KF), potassium bifluoride ($KHF_2$), ammonium difluoride ($NH_4HF_2$), to name a few, as well as mixtures of fluoride-containing compounds. Such fluoride-containing compounds may be used in either anhydrous or hydrated forms.

Non-limiting examples of anionic surfactants that may be contained in the surface activator include ammonium lauryl sulfate, dioctyl sodium sulfosuccinate, potassium lauryl sulfate, sodium dodecyl sulfate, sodium dodecylbenzenesulfonate, sodium lauryl sulfate, sodium lauroyl sarcosinate, sodium myreth sulfate, sodium pareth sulfate, sodium stearate, to name a few, as well as mixtures of anionic surfactants.

In some embodiments the thinning agent comprises: (i) about 3-8% by volume of ammonium fluoride; (ii) about 0.1-10% by volume of an anionic surfactant; and (iii) water. In other embodiments the thinning agent consists of: (i) about 3-8% by volume of ammonium fluoride; (ii) about 0.5-10% by volume of an anionic surfactant; and the balance is (iii) water. In some embodiments the thinning agent comprises: (i) about 3% by volume of ammonium fluoride; (ii) about 0.5% by volume of sodium lauryl sulfate; and (ii) water. In other embodiments the thinning agent comprises: (i) about 3.5% by volume of hydrofluoric acid; (ii) about 0.5% by volume of sodium lauryl sulfate; and (iii) about 96% by volume of ammonia water (23% by volume of ammonia in water).

In some embodiments a pH of the thinning agent ranges from about 6.0 to 7.6. In other embodiments the pH of the thinning agent ranges from about 6.5 to about 7.5.

Non-limiting examples of optical surfaces that may benefit from the methods disclosed herein includes FLIR systems that use medium and long wave infrared wavelengths, surveillance systems, systems that measure wild game habitats, drainage basin temperature monitoring systems, target acquisition and tracking systems used by military forces, automotive detectors that warn about sudden road obstructions caused by animals, such as deer, firefighting equipment used to locate people, search and rescue optics use for missing persons (e.g., in wooded areas or in water), oil industry equipment that detects leaks of natural gas and other gases, equipment for monitoring active volcanoes or high temperature geysers, equipment used to detect heat in faulty electrical joints, drug enforcement equipment that searches for drug labs, night vision goggles, automotive cameras exposed to the environment, submersible optical surfaces, and any other equipment that uses optics.

C. Field Kits for Field Repair or Modification of Optical Surfaces

The present disclosure also includes field kits for the field repair or modification of optical surfaces.

In some embodiments the field kit comprises: (i) a cleaner solution receptacle containing a fine cleaner as described above; (ii) an activator solution receptacle containing a surface activator as described above; (iii) a protective solution receptacle containing a protective reagent as described above; and (iv) a thinning solution receptacle containing a thinning agent as described above. In some embodiments the field kit further comprises: (v) a spray apparatus for spraying the protective reagent. Alternatively, in some embodiments the protective solution receptacle (iii) is in the form of a spray container for spraying the protective reagent. In some embodiments the field kit further comprises: (vi) at least one absorbent material, such as cotton applicators, cotton balls, cotton pads, natural fiber pads, or synthetic fiber pads, containing no lubricants or surfactants. In some embodiments the field kit further comprises: (vii) protective articles such as gloves to protect hands, and protective templates that may be applied to portions of a device that may be sensitive to reagents applied during the coating process.

D. Experimental Section

1. Standard Measurements and Evaluations 1.a ASTM F 21-65 (Atomizer Test)

This standard test method covers the detection of the presence of hydrophobic (nonwetting) films on surfaces and the presence of hydrophobic organic materials. When properly conducted, the test will enable detection of fractional molecular layers or hydrophobic organic contaminants.

The atomizer test is performed by subjecting the dry surface to be tested to a fine water spray. The interpretation of the test is based upon the pattern of wetting. In the absence of hydrophobic films, the impinging water droplets will wet the surface and spread immediately to form a continuous water film. In areas where hydrophobic materials are present on the surface, the sprayed droplets will not wet the surface and spread but will tend to remain as fine droplets.

Procedure: Hold the test surface 10 in. (250 mm) to 20 in. (500 mm) from the atomizer and spray with a fine mist of water for a period of 1 to 10 s.

Interpretation: Surfaces tested as described above shall be considered free of hydrophobic contaminants by this test if the impinging water droplets spread immediately to form a thin, continuous uniform water film (see figures included in ASTM F 21-65).

1.b ASTM F 22-13 (Water-Break Test)

This standard test method covers the detection of the presence of hydrophobic (nonwetting) films on surfaces and the presence of hydrophobic organic materials. When properly conducted, the test will enable detection of fractional molecular layers or hydrophobic organic contaminants. When used to verify the presence of a hydrophilic surface, this test is often referred to as a "water-break test;" whereas when used to verify the presence of a hydrophobic surface, this test is often referred to as a "reverse water-break test."

The water-break test is performed by withdrawing the surface to be tested, in a vertical position, from a container of purified water and observing the behavior of the water. For large parts, the test surface may be doused with water and the water behavior observed on removal of the water source. The interpretation of the test is based upon the pattern of wetting. Hydrophobic areas having a surface tension lower than water will cause the water to bead up at that location or "break" while draining. In the absence of hydrophobic films, the draining water layer will remain as a film over the surface. In areas where hydrophobic materials are present on the surface, the draining water layer will break up into a discontinuous film within one minute.

Procedure: Immerse the test surface in clean water. For very large surfaces, water may be applied to the vertical surface with a hose or gentle spray. Immediately upon removal from the water, or removal of the flowing water source, observe the gravity flow of the water from the test surface for 1 min.

Interpretation: Surfaces tested as describe above shall be considered free of hydrophobic contaminants by this test method if the draining water layer remains as a thin continuous film over the surface for 60 s after withdrawal of the surface from the immersion container or removal of the dousing water source (see figures included in ASTM F 22-13). If hydrophobic contaminants are present, as evidenced by formation of a discontinuous water film within 60 s after withdrawal from or of the test fluid, the length of time necessary for the water break to occur is a rough indication of the degree of contamination. A discontinuous film may appear in the form of localized or general beading of the water, or discontinuous flow of the water around discrete locations where contaminants are present (see figures included in ASTM F 22-13). Significant contamination will be apparent within 2 to 15 s.

2. Optical Surfaces Tested

The coating methods described below were applied to optical windows designed for a forward-looking infrared (FLIR) optical device. The optical windows (OW) are composed of an optical window substrate 2 comprising optical grade silicon and an AR coating 4 of magnesium fluoride ($MgF_2$) having an undercoating of praseodymium (Pr), see FIG. 1. Serial tests and small-scale exposure tests were conducted using optical window shards formed by cutting optical windows into pieces having average surface areas of approximately 1 $cm^2$.

3. Comparative Example 1 (CE1)

Non-Coated Control

Non-coated control experiments (CE1) were conducted on virgin optical windows composed of an optical grade silicon substrate coating only with an AR coating of magnesium fluoride having an undercoating of praseodymium.

4. Inventive Example 1 (E1)

Water-Based Coating

A fine cleaner solution was prepared by placing 250 ml of distilled water into a 400 ml beaker, adding 20 g of sodium metasilicate to the water, and then stirring the resulting mixture at a temperature from 49° C. (120° F.) to 54° C. (130° F.) until a visually homogeneous solution is formed. While the fine cleaner is still hot, a cotton ball is immersed into the solution and the wetted cotton ball is lightly swabbed over the entire surface of a virgin optical window from the top of the window downward to completely cover the surface. The optical window surface is maintained wet with the application of the fine cleaner solution for at least 5 minutes by repeating the swabbing procedure.

After at least 5 minutes has elapsed a spray bottle containing deionized water is used to spray deionized water over the entire surface of the optical window surface to completely rinse the surface free of the fine cleaner solution. This spraying is repeated three times.

After rinsing the optical window surface to remove the fine cleaner solution the cleaned optical window is evaluated by performing a water-break test or atomizer test under the conditions of ASTM 21-65 or ASTM 22-13 as described above. If the cleaned optical window surface exhibits a water break, then repeat the cleaning and evaluation steps as necessary until the cleaned optical window surfaces exhibits no water break.

A surface activator solution was prepared by filling a 500 ml graduated cylinder with 250 ml of deionized water, and then slowly adding 7.0 ml of hydrofluoric acid. After five minutes of stirring at ambient temperature, 5.0 ml of sulfuric acid is slowly added to the resulting acidic solution. After 60 minutes of stirring at ambient temperature slowly add 7.5 ml of 2-butoxy-ethanol and allow the resulting solution to stir at ambient temperature for about 30 minutes. After stirring the solution for about 30 minutes add a solution formed of 0.5 g of sodium lauryl sulfate in about 230 ml of deionized water, and then fill the graduated cylinder with enough distilled water to a total volume of 500 ml. Next pour the resulting solution into an open container and allow it to stand overnight. After the overnight standing period pour the solution back into the graduated cylinder and add more deionized water as necessary to a total volume of 500 ml to form the activator solution.

While the cleaned and evaluated optical window surface is still wet, swab the optical window with a cotton ball saturated with the activator solution. After 15 to 30 seconds have elapsed, rinse the optical window liberally with deionized water. Then dry the optical window using oil/vapor-free compressed air at a pressure from 50 to 60 psi. The resulting dried surface is an activated optical surface.

Immediately after the drying step, at an air temperature of between 26° C. (78° F.) and 29° C. (85° F.), use a Binks model 115 sprayer to spray the activated optical surface with BRYPLEX HTF-12® (commercial silicone emulsion containing 30 wt. % of polymer silicate and about 70 wt. % of PTFE) coating solution at a solution temperature of between 27° C. (80° F.) and 30° C. (86° F.) as a mist of solution applied over the entire window. Without delay, repeat the misting over the entire surface two more times. After the optical window is completely covered with the protective reagent solution allow the covered optical window to air dry for about 1 hour.

After the 1 hour air drying period is complete, preheated an oven to a temperature between 93° C. (200° F.) and 102° C. (215° F.), install a calibrated thermocouple sensor into the oven to allow monitoring of oven temperature. Place the air-dried optical window into the preheated oven and heat the optical window at a temperature between 93° C. (200° F.) and 102° C. (215° F.) for between 25 minutes and 35 minutes. After the prescribed heating period remove the optical window from the oven and allow the optical window to cool to ambient temperature.

A thinning agent solution was prepared by a Process 1 or a Process 2.

In Process 1, a graduated cylinder is filled with 97 ml of deionized water. In a separate container add 3.0 g of ammonium fluoride, and then add enough deionized water (less than 2 ml) to dissolve the ammonium fluoride. Add the resulting ammonium fluoride solution to the partially-filled graduated cylinder. Then add 0.5 g of sodium lauryl sulfate to the resulting solution and mix to form the thinning agent solution.

In Process 2, a graduated 250 ml cylinder is filled with between 90 ml to 100 ml of ammonia water (23% by volume of ammonia in water). Add enough 48% hydrofluoric acid to the resulting solution (about 3.5 ml) to set a pH of between 6.5 to 7.5. Let the resulting solution stand for 4 hours, and then add 0.5 g of sodium lauryl sulfate to the resulting solution to form the thinning agent solution.

After allowing the heat-cured optical window to cool to ambient temperature, warm the thinning agent solution to a temperature between 32° C. (90° F.) to 43° C. (110° F.) within a Teflon® beaker. Then saturate a cotton ball with the heated thinning agent solution and lightly wash the surface of the heat-cured optical window. After lightly washing the optical window surface with the thinning agent solution, rinse the optical window surface with deionized water and blow the surface drying using oil/vapor-free compressed air at a pressure from 50 to 60 psi.

After the optical windows is cooled to ambient temperature, the optical surface is evaluated by performing a water-break test or atomizer test under the conditions of ASTM 21-65 or ASTM 22-13 as described above. If the coated surface exhibits wetting indicative of a polar (hydrophilic) surface, then repeat the coating, drying, and curing steps above until the coated surface exhibits uniform beading and non-wettability.

The resulting coated optical window is designated as Inventive Example 1 (E1).

5. Inventive Example 2 (E2)

Organic Solvent-Based Coating

A fine cleaner solution was prepared by placing 250 ml of distilled water into a 400 ml beaker, adding 20 g of sodium metasilicate to the water, and then stirring the resulting mixture at a temperature from 49° C. (120° F.) to 54° C. (130° F.) until a visually homogeneous solution is formed. While the fine cleaner is still hot, a cotton ball is immersed into the solution and the wetted cotton ball is lightly swabbed over the entire surface of a virgin optical window (OW) from the top of the window downward to completely cover the surface. The optical window surface is maintained wet with the application of the fine cleaner solution for at least 5 minutes by repeating the swabbing procedure.

After at least 5 minutes had elapsed a spray bottle containing deionized water is used to spray deionized water over the entire surface of the optical window surface to completely rinse the surface free of the fine cleaner solution. This spraying is repeated three times.

After rinsing the optical window surface to remove the fine cleaner solution the cleaned optical window is evaluated by performing a water-break test or atomizer test under the conditions of ASTM 21-65 or ASTM 22-13 as described above. If the cleaned optical window surface exhibits a water break, then repeat the cleaning and evaluation steps as necessary until the cleaned optical window surfaces exhibits no water break.

A surface activator solution was prepared by filling a 500 ml graduated cylinder with 250 ml of deionized water, and then slowly adding 7.0 ml of hydrofluoric acid. After five minutes of stirring at ambient temperature slowly add 5.0 ml of sulfuric acid to the resulting acidic solution. After 60 minutes of stirring at ambient temperature slowly add 7.5 ml of 2-butoxy-ethanol and allow the resulting solution to stir at ambient temperature for about 30 minutes. After stirring the solution for about 30 minutes add a solution formed of 0.5 g of sodium lauryl sulfate in about 230 ml of deionized water, and then fill the graduated cylinder with enough distilled water to a total volume of 500 ml. Next pour the resulting solution into an open container and allow it to stand overnight. After the overnight standing period pour the solution back into the graduated cylinder and add more deionized water as necessary to a total volume of 500 ml to form the activator solution.

While the cleaned and evaluated optical window surface is still wet, swab the optical window with a cotton ball saturated with the activator solution. After 15 to 30 seconds have elapsed, rinse the optical window liberally with deionized water. Then dry the optical window using oil/vapor-free compressed air at a pressure from 50 to 60 psi. The resulting dried surface is an activated optical surface.

Immediately after the drying step, at an air temperature of between 21° C. (70° F.) and 29° C. (85° F.), spray the activated optical surface with Dow Corning 2634® coating solution (1.0-5.0 wt. % perfluoro polytrimethyleneoxide, 1.0-5.0 wt. % poly[oxy(1,1,2,2,3,3-hexafluoro-1,3-propanediyl)]-α-(heptafluoropropyl)-ω-[1,1,2,2-tetrafluoro-3-(1-propenyloxy)propoxy]-, 10-30 wt. % heptafluoropropoxy (poly(perfluoroPO)) tetrafluoropropyloxypropyltrimethoxysilane, 30-50 wt. % ethyl perfluoroisobutyl ether, 30-50 wt. % ethyl perfluorobutyl ether) as a mist of solution applied over the entire window. Without delay, repeat the misting over the entire surface two more times. After the optical window is completely covered with the protective reagent solution allow the covered optical window to air dry for 16 to 24 hours.

After the 16 to 24 hour air drying period is complete, preheat an oven to a temperature between 50° C. (122° F.) and 57° C. (135° F.), and then place a stainless steel pan containing approximately 100 ml of deionized water on the bottom of the preheated oven. Install a calibrated thermocouple sensor into the oven to allow monitoring of oven temperature. Place the air-dried optical window into the preheated oven and heat the optical window at a temperature between 50° C. (122° F.) and 57° C. (135° F.) for between 120 minutes and 135 minutes. After the prescribed heating period remove the optical window from the oven and allow the optical window to cool to ambient temperature.

A thinning agent solution was prepared by a Process 1 or a Process 2.

In Process 1, a graduated cylinder is filled with 97 ml of deionized water. In a separate container add 3.0 g of ammonium fluoride, and then add enough deionized water (less than 2 ml) to dissolve the ammonium fluoride. Add the resulting ammonium fluoride solution to the partially-filled graduated cylinder. Then add 0.5 g of sodium lauryl sulfate to the resulting solution and mix to form the thinning agent solution.

In Process 2, a graduated 250 ml cylinder is filled with between 90 ml to 100 ml of ammonia water (23% by volume of ammonia in water). Add enough 48% hydrofluoric acid to the resulting solution (about 3.5 ml) to set a pH of between 6.5 to 7.5. Let the resulting solution stand for 4 hours, and then add 0.5 g of sodium lauryl sulfate to the resulting solution to form the thinning agent solution.

After allowing the heat-cured optical window to cool to ambient temperature, warm the thinning agent solution to a temperature between 32° C. (90° F.) to 43° C. (110° F.) within a Teflon® beaker. Then saturate a cotton ball with the heated thinning agent solution and lightly wash the surface of the heat-cured optical window. After lightly washing the optical window surface with the thinning agent solution, rinse the optical window surface with deionized water and blow the surface drying using oil/vapor-free compressed air at a pressure from 50 to 60 psi.

After thinning and drying the optical surface it is evaluated by performing a water-break test or atomizer under the conditions of ASTM 21-65 or ASTM 22-13 as described above. If the coated surface exhibits wetting indicative of a polar (hydrophilic) surface, then repeat the coating, drying, curing and thinning steps above until the coated surface exhibits uniform beading and non-wettability.

The resulting coated optical window is designated as Inventive Example 2 (E2).

6. Testing and Evaluations 6.a. Contaminant-Induced Corrosion at Elevated Temperatures CE1, E1 and E2 were evaluated for contaminant-induced corrosion at elevated temperatures to assess the relative amounts of protection provided by the non-protective-coated control window (CE1), the water-based protective-coated window (E1) and the organic-based protective-coated window (E2), which are described above.

Figure 2:
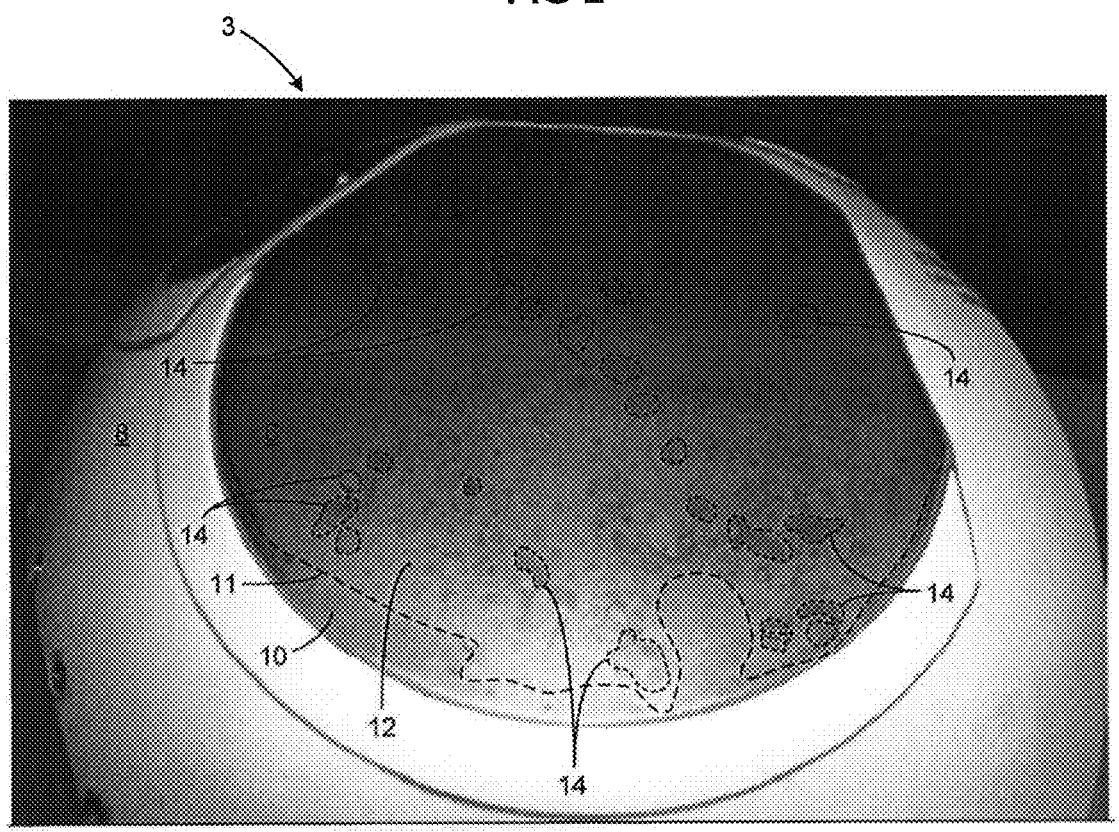
FIG. 2 illustrates a field-turreted electro-optic device containing a damaged optical surface.

Modified Gun Grease: A corrosive test material labeled as "modified gun grease" was formulated to replicate corrosive environment conditions experience by optical windows contained in certain field-turreted electro-optic devices 3 (see FIG. 2). The modified gun grease is a composition comprising: (i) 1 part sodium biocarbonate ($NaHCO_3$); (ii) 1 part sodium nitrate ($NaNO_3$); (iii) 1 part ammonium sulfate ($(NH_4)_2SO_4$); and (iv) 0.5 parts trisodium phosphate ($Na_3PO_4$) as a 26 mg powder mixture compounded into 26 g of a light synthetic grease (MilComm TW25B®).

Test conditions: The modified gun grease was applied to shards of the optical surfaces CE1, E1 and E2 measuring approximately 1 $cm^2$, and the shards were subjected to different temperatures for 24 hours. The shards of the optical surfaces CE1, E1 and E2 were then visually evaluated for signs of oxidation. Oxidation of praseodymium (Pr) contained in the AR coating is evidenced by the formation of a yellow-green surface color, as compared to the green surface color of the non-oxidized optical surfaces. The results are summarized in Table I below.

TABLE 1

Results of Grease Tests performed at Ambient to 450° F.

| Contaminant | Temperature | CE1 | E1 | E2 |
|---|---|---|---|---|
| Modified Gun Grease | ambient | Pass | Pass | Pass |
| Modified Gun Grease | 150° F. | Pass | Pass | Pass |
| Modified Gun Grease | 300° F. | Fail | Fail | Pass |
| Modified Gun Grease | 350° F. | Fail | Fail | Pass |
| Modified Gun Grease | 450° F. | Fail | Fail | Pass |

Pass: surface maintains green color with no visible formation of yellow-green color
Fail: surface shows visible signs of yellowing As shown in Table I, the non-protective-coated control window (CE1) did not undergo oxidation at ambient temperature and at 150° F., but did become oxidized at temperatures at or above 300° F. The water-based protective-coated window (E1) also did not undergo oxidation at ambient temperature and at 150° F., but did because oxidized at temperatures at or above 300° F. By contrast, the organic-based protective-coated window (E2) did not undergo oxidation at any of the temperatures tested.

From this experimental data it is observed that the organic-based protective-coated window (E2) provides enhanced protection at temperatures at or above 300° F., which is not provided by the water-based protective-coated window (E1).

Additional experiments were also conducted using the same test conditions described above, except that: (a) the optical window shards CE1, E1 and E2 were held at 32° F. prior to exposure to the modified gun grease; (b) the shards CE1, E1 and E2 were inspected after both 1 day and 5 days for each temperature test; and (c) the upper temperature was increased from 450° F. to 600° F. The results are summarized in Table II below.

TABLE II

Results of Grease Tests performed at 32° F. to 600° F.

| Con-tam-inant | Temp. | CE1 | | E1 | | E2 | |
|---|---|---|---|---|---|---|---|
| | | (1 day) | (5 day) | (1 day) | (5 day) | (1 day) | (5 day) |
| Modified Gun Grease | ambient | Pass | Pass | Pass | Pass | Pass | Pass |

TABLE II-continued

Results of Grease Tests performed at 32° F. to 600° F.

| Contaminant | Temp. | CEI (1 day) | CEI (5 day) | E1 (1 day) | E1 (5 day) | E2 (1 day) | E2 (5 day) |
|---|---|---|---|---|---|---|---|
| Modified Gun Grease | 150° F. | Pass | Pass | Pass | Pass | Pass | Pass |
| Modified Gun Grease | 300° F. | Pass | Fail | Pass | Fail | Pass | Pass |
| Modified Gun Grease | 450° F. | Fail | Fail | Fail | Fail | Pass | Pass |
| Modified Gun Grease | 600° F. | Fail | Fail | Fail | Fail | Pass | Pass |

Pass: surface maintains green color with no visible formation of yellow-greencolor
Fail: surface shows visible signs of yellowing As shown in Table II, the non-protective-coated control window (CE1) did not undergo oxidation at ambient temperature and at 150° F. or at 300° F. after 1 day, but did become oxidized at 300° F. after 5 days and at all temperatures at or above 450° F. after only 1 day. The water-based protective-coated window (E1) also did not undergo oxidation at ambient temperature and at 150° F. or at 300° F. after 1 day, but did become oxidized at 300° F. after 5 days and at all temperatures at or above 450° F. after only 1 day. By contrast, the organic-based protective-coated window (E2) did not undergo oxidation at any of the temperatures tested.

From this experimental data it is observed that the organic-based protective-coated window (E2) provides enhanced protection at temperatures at or above 300° F., which is not provided by the water-based protective-coated window (E1). Importantly, the organic-based protective-coated window (E2) was protected against oxidation at temperatures as high as 600° F. even after 5 days at this temperature.

Additional testing was conducted on the organic-based protective-coated window (E2) to assess its ability to withstand the harmful effects of other environmental contaminants and conditions, as well as any negative impact that the protective monolayer coating 16 may have on the optical properties of the protected optical window.

6.b. Optical Transmittance

The non-protective-coated control window (CE1) and the organic-based protective-coated window (E2) were further evaluated to determine any negative effects that the organic-based protective monolayer coating 16 may have on the optical properties of the AR coated optical window. A CI Systems spectroradiometer was used to measure transmittance for CE1 and E2 over wavelengths ranging from about 2.5 μm to about 5.5 μm. For each test measurements were made at five different locations on the surfaces of the respective windows CE1 and E2, and the data values were averaged to generate plots of transmittance (vertical axis) versus wavelength (horizontal axis) as shown in FIG. 8.

Figure 8:
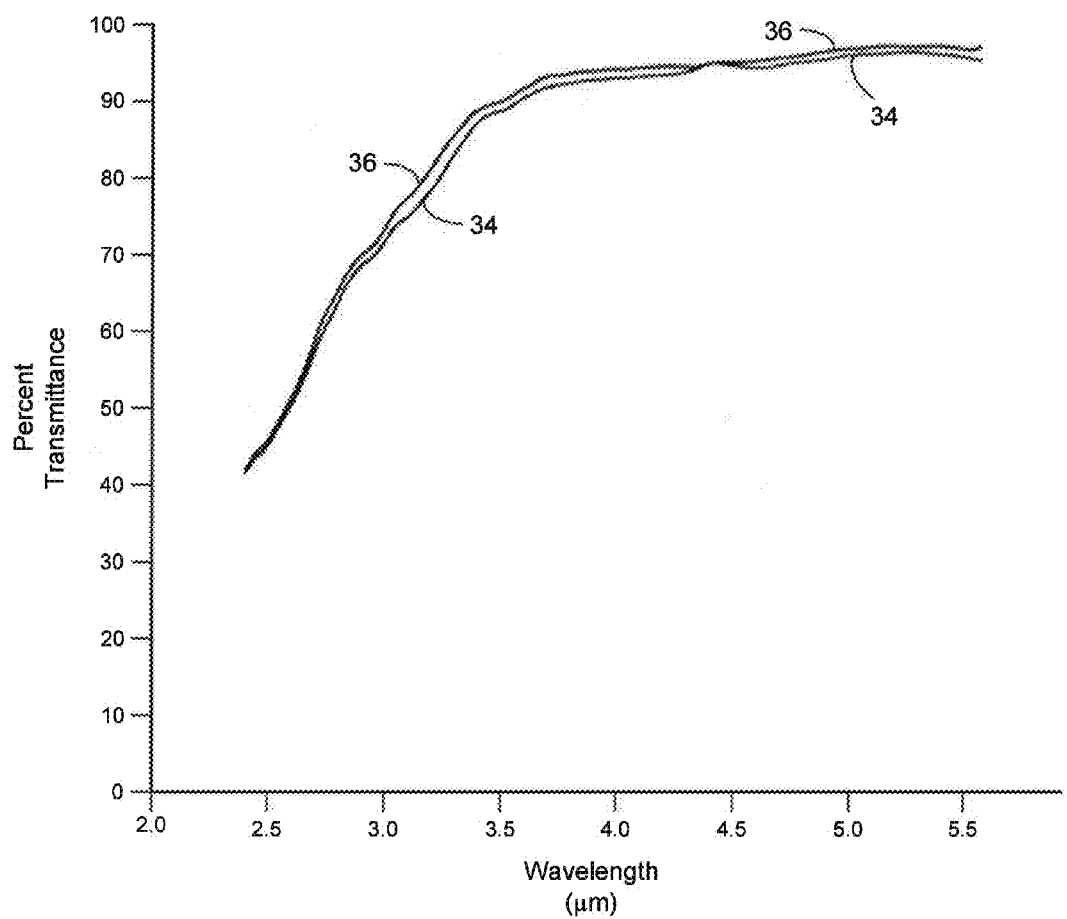
FIG. 8 is a graph of transmittance versus wavelength.

As shown in FIG. 8, the transmittance plot 36 for the organic-based protective-coated window (E2) is slightly higher than the corresponding transmittance plot 34 for the non-protective-coated control window (CE1). Based upon the experimental error for the transmittance measurements, it is concluded that the organic-based protective monolayer coating 16 does not adversely affect the optical properties of an AR coated optical window.

6.c Wetting Characteristics after Thermal Cycling

Wetting characteristics were compared for the non-protective-coated control window (CE1), the water-based protective-coated window (E1) and the organic-based protective-coated window (E2) to access the relative abilities of the protective coatings in (E1) and (E2) to resist contact with a hydrophobic substance.

Windows shards of CE1, E1 and E2 were subjected to thermal cycling involving raising and lowering their temperatures from 22° F. to 80° F. for ten (10) cycles. Following thermal cycling a small amount (dot) of a light synthetic grease (MilComm TW25B®) was applied to the surface of each shard and the respective wetting characteristics were assessed. The results are summarized in Table II below.

As shown in Table III below, both the water-based coating E1 and the organic-based coating E2 provides superior resistance to grease wetting when compared to the non-protective-coated control CE1. The organic-based coating E2 was found to provide greater protection against grease wetting relative to the water-based coating E1.

TABLE III

Results of Grease Wetting Tests after Thermal Cycling

| | CE1 | E1 | E2 |
|---|---|---|---|
| Grease Wetting Characteristics | Poor | Fair | Good |

Poor: grease migrates freely across the optical surface
Fail: grease shows partial migration across the opticalsurface
Good: grease shows no migration across the optical surface As shown in Table III, both the water-based coating E1 and the organic-based coating E2 provides superior resistance to grease wetting when compared to the non-protective-coated control CE1. The organic-based coating E2 was found to provide greater protection against grease wetting relative to the water-based coating E1.

6.d Oxidation Resistance

Oxidation resistance characteristics were compared for the non-protective-coated control window (CE1), the water-based protective-coated window (E1) and the organic-based protective-coated window (E2) to access the relative abilities of the protective coatings in (E1) and (E2) to resist oxidation by an airborne oxidant.

An atmosphere containing chlorine gas was generated inside of a sealed container by adding calcium hypochlorite to mildly acidic water. Window shards of CE1, E1 and E2 were then suspended over the water in an atmosphere containing dilute chlorine gas for 6 hours. Following the 6 hour exposure period, the window shards were washed off with Dawn® detergent, rinsed with deionized water, and then visually evaluated for oxidation (indicated by the formation of the color yellow). The results are summarized in Table IV below.

TABLE IV

Results of Exposure to Atmospheric Chlorine

|  | CE1 | E1 | E2 |
|---|---|---|---|
| Oxidation Resistance | Poor | Fair | Good |

Poor: shows extensive oxidation (as indicated by solid yellow color)
Fail: shows slight oxidation (as indicated by slight yellow-green color)
Good: shows no oxidation (as indicated by only green color)

As shown in Table IV, the organic-based coating E2 provided better resistance to oxidation when compared to both non-coated control window CE1 and the water-based coating E1. The water-based coating E1 offers partial resistance to oxidation.

6.e Chemical Compatibility and Testing

Chemical compatibility and resistance testing was conducted on the organic-based protective-coated window (E2) to assess resistance to a variety of chemicals under conditions of physical agitation. Window shards of E2 were immersed in each of the compositions listed below for 30 seconds and then where rubbed 50 times with a KIMWIPE® paper wipe saturated with the respective composition being tested. The wetting characteristics of the resulting coatings were then tested using the reverse water-break test to determine whether the coatings continued to exhibit uniform water "breaks" indicating the presence of uniform non-polar (hydrophobic) surfaces. For all of the compositions listed below no visual changes in appearance or wetting characteristics was observed:

Diesel fuel
Gasoline
Kerosene
Hydraulic fluid
Antifreeze
WD-40
Mineral oil
Silicone grease
Isopropyl alcohol
Acetone
Bleach (undiluted)
Commercial detergents (Dawn®, Alconox®)
Naptha-based solvents
Deionized water
Salt water (saturated)
Mashed bug matter (love bugs)

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Therefore, the breadth and scope of the subject matter provided herein should not be limited by any of the above explicitly described embodiments. Rather, the scope of the embodiments should be defined in accordance with the following claims and their equivalents.

The invention claimed is:

1. A method for producing a covalently bound, monolayer protective coating on the surface of a material, the method comprising:

(i) activating the surface of the material by contacting the surface with a surface activator that increases the concentration of polar binding sites on the surface to form a polar surface, wherein the surface activator comprises an organic solvent and a first fluoride-containing compound selected from the group consisting of barium fluoride ($BaF_2$), hydrogen fluoride (HF), ammonium fluoride ($NH_4F$), sodium fluoride (NaF), sodium bifluoride ($NaHF_2$), potassium fluoride (KF), potassium bifluoride ($KHF_2$), ammonium difluoride ($NH_4HF_2$), any hydrate thereof, and any mixture thereof;

(ii) coating the activated polar surface of (i) with a protective reagent that reacts with the activated surface of (i) to form a covalently bound protective coating; and (iii) thinning the covalently bound protective coating by contacting the covalently bound protective coating with a thinning agent that removes additional outer layers of coating and contaminants, wherein the thinning agent comprises a surfactant and a second fluoride-containing compound selected from the group consisting of barium fluoride ($BaF_2$), hydrogen fluoride (HF), ammonium fluoride ($NH_4F$), sodium fluoride (NaF), sodium bifluoride ($NaHF_2$), potassium fluoride (KF), potassium bifluoride ($KHF_2$), ammonium difluoride ($NH_4HF_2$), any hydrate thereof, and any mixture thereof;

to form a covalently bound monolayer protective coating on the surface.

2. The method of claim 1, further comprising:

before the activating step (i), performing a first surface test on the surface of the material in order to detect the presence or absence of a hydrophobic film or substance on the surface of the material; and after the thinning step (iii), performing a second surface test on the final coated surface in order to detect the presence or absence of a hydrophilic area or substance on the final coated surface.

3. The method of claim 1, further comprising contacting the surface of the material with a cleaner to clean the surface of the material.

4. The method of claim 3, wherein the cleaner is an alkaline cleaner.

5. The method of claim 3, wherein the cleaner comprises at least one selected from the group consisting of a phosphate salt, a silicate salt, a carbonate salt, and a borate salt.

6. The method of claim 3, wherein the cleaner comprises a sodium silicate.

7. The method of claim 3, wherein the cleaner is warmed to a predetermined cleaning temperature at which the contacting of the surface of the material with the cleaner occurs.

8. The method of claim 1, wherein subsequent to (ii) and before (iii), the method comprises drying the covalently bound protective coating for a predetermined drying time period to form a dried covalently bound protective coating and heating the dried covalently bound protective coating at a predetermined drying temperature and at a predetermined drying humidity for a predetermined heating time period.

9. The method of claim 1, further comprising, before the activating step (i):
(A) contacting the surface of the material with an alkaline cleaner to clean the surface of the material;
(B) performing a first surface test on the surface of the material in order to detect the presence or absence of a hydrophobic film or substance on the surface of the material; and
(C) optionally repeating the contacting step (A) and the performing step (B) until the surface test indicates that the surface of the material is a uniformly hydrophilic surface with no hydrophobic area or substance detected.

10. The method of claim 2, further comprising repeating coating step (ii), thinning step (iii), and performing the second surface test until the second surface test indicates that the final coated surface is a uniformly hydrophobic surface with no hydrophilic area or substance detected.

11. The method of claim 1, wherein the surface activator comprises the first fluoride-containing compound, the organic solvent, an acid, an anionic surfactant, and water.

12. The method of claim 1, wherein the surface activator comprises:
at least one selected from the group consisting of barium fluoride, hydrogen fluoride, ammonium fluoride, sodium fluoride, sodium bifluoride, potassium fluoride, potassium bifluoride, and ammonium difluoride;
at least one selected from the group consisting of hydrochloric acid, sulfuric acid, nitric acid, hydrobromic acid, hydroiodic acid, chloric acid, perchloric acid, formic acid, acetic acid, trichloroacetic acid, nitrous acid, sodium hydrogen sulfate and potassium hydrogen sulfate;
a polar protic organic solvent or a polar aprotic organic solvent; and
an anionic surfactant.

13. The method of claim 1, wherein the surface activator comprises water and:
about 0.1 to 10 percent by volume of the first fluoride-containing compound;
about 0.1 to 10 percent by volume of an acid;
about 0.1 to 20 percent by volume of the organic solvent; and
about 0 to 10 percent by volume of an anionic surfactant.

14. The method of claim 1, wherein the surface activator comprises water and:
about 0.1 to 10 percent by volume of at least one selected from the group consisting of barium fluoride, hydrogen fluoride, ammonium fluoride, sodium fluoride, sodium bifluoride, potassium fluoride, potassium bifluoride, ammonium difluoride;
about 0.1 to 10 percent by volume of at least one selected from the group consisting of hydrochloric acid, sulfuric acid, nitric acid, hydrobromic acid, hydroiodic acid, chloric acid, perchloric acid, formic acid, acetic acid, trichloroacetic acid, nitrous acid, sodium hydrogen sulfate and potassium hydrogen sulfate;
about 0.1 to 20 percent by volume of at least one selected from the group consisting of methanol, ethanol, formic acid, n-butanol, isopropanol, 2,2,2-tribromoethanol, 2,2,2-trichloroethanol, 2,2,2-trifluoroethanol, 2,2-dichloroethanol, 2-chloroethanol, 2-fluoroethanol, 2-nitroethanol, 1,1,1,3,3,3-hexafluoro-2-propanol, 2,2,3,3,3-pentafluoro-1-propanol, 2,2,3,3-tetrafluoro-1-propanol, 1,1,1-trifluoropropanol, 3,3,3-trifluoro-1-propanol, 1,3-difluoro-2-propanol, 1,3-dichloro-2-propanol, 3-fluoro-1-propanol, 2-pentanol, 2-methyl-1-butanol, 2,2-dimethyl-1-propanol, 2-methyl-1-butanol, 3-methyl-2-butanol, 3-pentanol, 1-ethoxyl-2-propanol, 1-methoxy-2-butanol, 1-methoxy-2-methyl-propanol, 2-isopropoxyethanol, 3-ethoxy-1-propanol, 3-methoxy-1-butanol, 2-butoxyethanol, 1-methoxy-2-butanol, 1-methoxy-2-methyl-2-propanol, 2-isopropoxyethanol, 3-ethoxy-1-propanol, 3-methoxy-1-butanol, 1,1-dimethoxy-2-propanol, 2-(methoxymethoxy)-1-propanol, cyclohexanol, cyclopentanemethanol, 2-methylcyclopentanol, 1-hexanol, 2,3-dimethyl-2-butanol, 2-ethyl-1-butanol, 2-hexanol, 2-methyl-1-pentanol, 2-methyl-2-pentanol, 2-methyl-3-pentanol, 3,3-dimethyl-1-butanol, 3,3-dimethyl-2-butanol, 3-hexanol, 3-methyl-1-pentaol, 3-methyl-2-pentanol, 3-methyl-3-pentanol, 4-methyl-1-pentanol, 4-methyl-2-pentanol, 3-methoxy-3-methyl-1-butanol, 1,1,1,3,3,3-hexafluoro-2-phenyl-2-propanol, 3,5-bus(trifluoromethyl)benzyl alcohol, 2-(trifluoromethyl)phenethyl alcohol, 3-(trifluoromethyl)phenethyl alcohol, 4-(trifluoromethyl)phenethyl alcohol, 2-[4-(trifluoromethoxy)phenyl]ethanol, 2-hydroxymethyl-1,4-benzodioxane, 3,4-(methylenedioxy)phenethyl alcohol, 3-(4-chlorophenyl)1-propanol, 2-phenyl-2-propanol, benzyl alcohol, 3,4-dimethylbenzyl alcohol, 1-phenoxy-2-propanol, 2-(4-methylphenoxy)ethanol, 2-(benzyloxy)ethanol, 2-ethoxy-4-methylphenol, 2-ethoxybenzyl alcohol, 2-methoxy-2-phenylethanol, 2-methoxyphenethyl alcohol, 3-(4-hydroxyphenyl)1-propanol, 3-thoxybenzyl alcohol, 3-methoxyphenethyl alcohol, and 4-methoxyphenethyl alcohol; and
about 0.1 to 10 percent by volume of at least one anionic surfactant.

15. The method of claim 1, wherein the protective reagent comprises a fluoroalkylsilane of the formula (II):

$$A_n\text{-Si}—B_{4-n} \qquad (II),$$

wherein:
A independently represents a fluorinated organic group;
B independently represents a halogen atom, an ester group, an amino group, or an alkoxy group; and
n represents an integer of 1 or 2.

16. The method of claim 1, wherein the protective reagent comprises a perfluoropolyether functional trialkoxysilane.

17. The method of claim 1, wherein the protective reagent comprises a silane of formula (I):

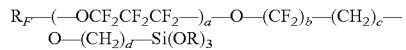

$$R_F\text{—}(\text{—}OCF_2CF_2CF_2\text{—})_a\text{—}O\text{—}(CF_2)_b\text{—}(CH_2)_c\text{—}O\text{—}(CH_2)_d\text{—}Si(OR)_3 \quad (I),$$

wherein:
$R_F$ represents a straight chain or branched perfluorinated alkyl group having 1 to 20 carbon atoms;
R represents a $C_1$-$C_{10}$ alkyl group;
a represents an integer of 1 to 200;
b represents an integer of 0 to 10;
c represents an integer of 0 to 10; and
d represents an integer of 0 to 8.

18. The method of claim 1, wherein the thinning agent comprises an anionic surfactant and at least one selected from the group consisting of barium fluoride, hydrogen fluoride, ammonium fluoride, sodium fluoride, sodium bifluoride, potassium fluoride, potassium bifluoride, and ammonium difluoride.

19. The method of claim 1, wherein the thinning agent comprises:
about 1 to 10 percent by volume the second fluoride-containing compound; and
about 1 to 20 percent by volume of an anionic surfactant.

20. The method of claim 1, wherein the thinning agent comprises:
about 3 to 8 percent by volume of at least one selected from the group consisting of barium fluoride, hydrogen fluoride, ammonium fluoride, sodium fluoride, sodium bifluoride, potassium fluoride, potassium bifluoride, and ammonium difluoride;
about 2 to 10 percent by volume of at least one selected from the group consisting of ammonium lauryl sulfate, dioctyl sodium sulfosuccinate, potassium lauryl sulfate, sodium dodecyl sulfate, sodium dodecylbenzenesulfonate, sodium lauryl sulfate, sodium lauroyl sarcosinate, sodium myreth sulfate, sodium pareth sulfate, and sodium stearate; and water.

21. The method of claim 1, wherein the material is metal, glass, ceramic, composite, plastic, or mixtures thereof.

22. The method of claim 1, wherein the material is an optical material.

23. The method of claim 1, wherein the surface of the material is an antireflective coating.

24. A method for coating a surface of a material, the method consisting of:
(a) contacting the surface of the material with a cleaner to clean the surface of the material;
(b) performing a first surface test on the surface of the material in order to detect the presence or absence of a hydrophobic film or substance on the surface of the material;
(c) optionally repeating the steps (a) and (b) until the first surface test indicates that the surface of the material is a uniformly hydrophilic surface with no hydrophobic area or substance detected;
(d) contacting the surface of the material with a surface activator comprising a first fluoride-containing compound and an organic solvent to form an activated surface;
(e) contacting the activated surface with a protective reagent to form an initial coated surface;
(f) drying the initial coated surface for a predetermined drying time period to form a dried initial coated surface;
(g) heating the dried initial coated surface at a predetermined drying temperature and at a predetermined drying humidity for a predetermined heating time period to form a heated, dried initial coated surface;
(h) contacting the heated, dried initial coated surface with a thinning agent comprising a second fluoride-containing compound and a surfactant to form a final coated surface;
(i) performing a second surface test on the final coated surface in order to detect the presence or absence of a hydrophilic area or substance on the final coated surface; and
(j) optionally repeating the steps (e), (f), (g), (h) and (i) until the second surface test indicates that the final coated surface is a uniformly hydrophobic surface with no hydrophilic area or substance detected,
wherein the final coated surface is coated with a protective coating that is covalently bonded to the surface of the material.

* * * * *